(12) United States Patent
Mukhopadhyay et al.

(10) Patent No.: US 9,540,885 B2
(45) Date of Patent: *Jan. 10, 2017

(54) POLYCRYSTALLINE DIAMOND COMPACTS, RELATED PRODUCTS, AND METHODS OF MANUFACTURE

(71) Applicant: US SYNTHETIC CORPORATION, Orem, UT (US)

(72) Inventors: Debkumar Mukhopadhyay, Sandy, UT (US); Jair J. Gonzalez, Provo, UT (US)

(73) Assignee: US SYNTHETIC CORPORATION, Orem, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/857,627

(22) Filed: Sep. 17, 2015

(65) Prior Publication Data

US 2016/0002982 A1    Jan. 7, 2016

Related U.S. Application Data

(63) Continuation-in-part of application No. 13/648,913, filed on Oct. 10, 2012, which is a continuation-in-part of application No. 13/275,372, filed on Oct. 18, 2011.

(51) Int. Cl.

| | | |
|---|---|---|
| *B22F 3/14* | (2006.01) | |
| *E21B 10/567* | (2006.01) | |
| *B24D 3/06* | (2006.01) | |
| *B24D 99/00* | (2010.01) | |
| *B24D 18/00* | (2006.01) | |
| *B22F 7/06* | (2006.01) | |
| *C22C 26/00* | (2006.01) | |
| *B22F 5/00* | (2006.01) | |

(52) U.S. Cl.
CPC ............. *E21B 10/567* (2013.01); *B22F 3/14* (2013.01); *B22F 7/062* (2013.01); *B24D 3/06* (2013.01); *B24D 18/0009* (2013.01); *B24D 99/005* (2013.01); *C22C 26/00* (2013.01); *B22F 2005/001* (2013.01); *B22F 2999/00* (2013.01)

(58) Field of Classification Search
None
See application file for complete search history.

(56) References Cited

U.S. PATENT DOCUMENTS 3,149,411 A * 9/1964 Wilder .................. C22C 29/067
                                                164/97
3,293,012 A * 12/1966 Smiley ..................... B24D 3/08
                                                228/121

(Continued)

FOREIGN PATENT DOCUMENTS

WO    WO 2012/009285    1/2012

OTHER PUBLICATIONS

U.S. Appl. No. 12/961,787, filed Dec. 7, 2010, Mukhopadhyay et al.
(Continued)

*Primary Examiner* — George Wyszomierski
*Assistant Examiner* — Ngoclan T Mai
(74) *Attorney, Agent, or Firm* — Dorsey & Whitney LLP

(57) ABSTRACT

Embodiments relate to polycrystalline diamond compacts ("PDCs") and methods of manufacturing such PDCs in which an at least partially leached polycrystalline diamond ("PCD") table is infiltrated with a low viscosity cobalt-based alloy infiltrant.

19 Claims, 6 Drawing Sheets

(56) References Cited

U.S. PATENT DOCUMENTS

| | | | |
|---|---|---|---|
| 3,372,010 | A | 3/1968 | Parsons |
| 4,018,576 | A * | 4/1977 | Lowder .................. B23K 1/19 |
| | | | 51/307 |
| 4,171,339 | A | 10/1979 | Lee |
| 4,268,276 | A | 5/1981 | Bovenkerk |
| 4,274,900 | A | 6/1981 | Mueller |
| 4,410,054 | A | 10/1983 | Nagel et al. |
| 4,468,138 | A | 8/1984 | Nagel |
| 4,534,773 | A | 8/1985 | Phaal et al. |
| 4,560,014 | A | 12/1985 | Geczy |
| 4,738,322 | A | 4/1988 | Hall et al. |
| 4,811,801 | A | 3/1989 | Salesky et al. |
| 4,871,377 | A * | 10/1989 | Frushour ............. B24D 3/007 |
| | | | 51/295 |
| 4,907,377 | A | 3/1990 | Csillag et al. |
| 4,913,247 | A | 4/1990 | Jones |
| 5,016,718 | A | 5/1991 | Tandberg |
| 5,092,687 | A | 3/1992 | Hall |
| 5,120,327 | A | 6/1992 | Dennis |
| 5,135,061 | A | 8/1992 | Newton, Jr. |
| 5,154,245 | A | 10/1992 | Waldenstrom et al. |
| 5,364,192 | A | 11/1994 | Damm et al. |
| 5,368,398 | A | 11/1994 | Damm et al. |
| 5,460,233 | A | 10/1995 | Meany et al. |
| 5,480,233 | A | 1/1996 | Cunningham |
| 5,544,713 | A | 8/1996 | Dennis |
| 5,711,702 | A | 1/1998 | Devlin |
| 5,871,060 | A | 2/1999 | Jensen et al. |
| 6,003,623 | A | 12/1999 | Miess |
| 6,488,106 | B1 | 12/2002 | Dourfaye |
| 6,793,681 | B1 | 9/2004 | Pope et al. |
| 7,377,341 | B2 | 5/2008 | Middlemiss et al. |
| 7,552,782 | B1 | 6/2009 | Sexton et al. |
| 7,559,695 | B2 | 7/2009 | Sexton et al. |
| 7,828,088 | B2 | 11/2010 | Middlemiss et al. |
| 7,866,418 | B2 | 1/2011 | Bertagnolli et al. |
| 8,066,087 | B2 | 11/2011 | Griffo et al. |
| 8,328,891 | B2 | 12/2012 | Zhang et al. |
| 8,596,387 | B1 | 12/2013 | Sani et al. |
| 8,727,045 | B1 | 5/2014 | Mukhopadhyay |
| 2005/0211475 | A1 * | 9/2005 | Mirchandani ......... C22C 29/067 |
| | | | 175/426 |
| 2005/0230156 | A1 | 10/2005 | Belnap et al. |
| 2006/0266558 | A1 | 11/2006 | Middlemiss et al. |
| 2009/0152018 | A1 | 6/2009 | Sani |
| 2010/0012389 | A1 | 1/2010 | Zhang |
| 2010/0193252 | A1 | 8/2010 | Mirchandani et al. |
| 2011/0067929 | A1 | 3/2011 | Mukhopadhyay et al. |
| 2012/0040183 | A1 * | 2/2012 | Kelkar .................. B22F 3/1035 |
| | | | 428/367 |
| 2012/0138370 | A1 | 6/2012 | Mukhopadhyay |
| 2012/0261197 | A1 | 10/2012 | Miess et al. |
| 2013/0092451 | A1 | 4/2013 | Mukhopadhyay et al. |
| 2013/0092452 | A1 | 4/2013 | Mukhopadhyay et al. |

OTHER PUBLICATIONS

U.S. Appl. No. 13/027,954, filed Feb. 15, 2011, Miess et al.
U.S. Appl. No. 13/087,775, filed Apr. 15, 2011, Miess et al.
U.S. Appl. No. 13/690,397, filed Nov. 30, 2012, Miess et al.
U.S. Appl. No. 61/768,812, filed Feb. 25, 2013, Mukhopadhyay.
U.S. Appl. No. 13/795,027, filed Mar. 12, 2013, Mukhopadhyay et al.
U.S. Appl. No. 13/863,465, filed Apr. 16, 2013, Castillo, et al.
U.S. Appl. No. 13/954,545, filed Jul. 30, 2013, Mukhopadhyay.
U.S. Appl. No. 14/313,715, filed Jun. 24, 2014, Mukhopadhyay et al.
U.S. Appl. No. 14/539,015, filed Nov. 12, 2014, Mukhopadhyay et al.
U.S. Appl. No. 62/096,315, filed Dec. 23, 2014, Heaton et al.
U.S. Appl. No. 62/187,574, filed Jul. 1, 2015, Heaton.
ASTM B887-03 (2008) "Standard Test Method for Determination of Coercivity (Hcs) of Cemented Carbides".
ASTM B886-03 (2008), "Standard Test Method for Determination of Magnetic Saturation (Ms) of Cemented Carbides".
Hildebrand et al., "Viscosity of liquid metals: An interpretation"; Proc. Nat. Acad. Sci. USA, vol. 73, No. 4, pp. 988-989, Apr. 1976.
International Search Report and Written Opinion from International Application No. PCT/US2012/059706 mailed Apr. 19, 2013.
U.S. Appl. No. 13/863,465, Jul. 28, 2015, Office Action.
U.S. Appl. No. 13/275,372, Aug. 22, 2014, Office Action.
U.S. Appl. No. 13/275,372, Jan. 28, 2015, Office Action.
U.S. Appl. No. 13/275,372, Jun. 24, 2015, Notice of Allowance.
U.S. Appl. No. 13/648,913, Jun. 25, 2015, Office Action.
U.S. Appl. No. 15/005,765, filed Jan. 25, 2016, Mukhopadhyay et al.
U.S. Appl. No. 15/050,105, filed Feb. 22, 2016, Castillo et al.
U.S. Appl. No. 13/863,465, Oct. 23, 2015, Interview Summary.
U.S. Appl. No. 13/863,465, Nov. 17, 2015, Notice of Allowance.
U.S. Appl. No. 13/863,465, Mar. 9, 2016, Issue Notification.
U.S. Appl. No. 12/275,372, Apr. 14, 2015, Office Action.
U.S. Appl. No. 12/275,372, Oct. 23, 2015, Notice of Allowance.
U.S. Appl. No. 12/275,372, Feb. 10, 2016, Issue Notification.
U.S. Appl. No. 13/648,913, Dec. 4, 2015, Office Action.
U.S. Appl. No. 13/648,913, Jul. 8, 2016, Notice of Allowance.

* cited by examiner

POLYCRYSTALLINE DIAMOND COMPACTS, RELATED PRODUCTS, AND METHODS OF MANUFACTURE

CROSS-REFERENCE TO RELATED APPLICATIONS

This application is a continuation-in-part of U.S. patent application Ser. No. 13/648,913 filed 10 Oct. 2012, which is a continuation-in-part of U.S. patent application Ser. No. 13/275,372 filed 18 Oct. 2011, now U.S. Pat. No. 9,272,392 the disclosure of each of which is incorporated herein, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. Cobalt is often used as the catalyst material for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst. Once the PCD table is formed, the solvent catalyst may be at least partially removed from the PCD table of the PDC by acid leaching.

Despite the availability of a number of different PDCs, manufacturers and users of PDCs continue to seek PDCs that exhibit improved toughness, wear resistance, thermal stability, or combinations thereof.

SUMMARY

Embodiments of the invention relate to PDCs and methods of manufacturing such PDCs in which an at least partially leached PCD table is infiltrated with an alloy infiltrant comprising a cobalt-boron-silicon based alloy infiltrant=. By decreasing the melting temperature of the alloy infiltrant, a viscosity of the alloy infiltrant is lower as compared to a viscosity of pure cobalt at any given processing temperature and pressure. The lower viscosity promotes more uniform infiltration into the at least partially leached PCD table.

In an embodiment, a method of fabricating a PDC is disclosed. The method of fabricating a PDC includes forming a PCD table in the presence of a metal-solvent catalyst in a first HPHT process. The PCD table includes a plurality of bonded diamond grains defining a plurality of interstitial regions, at least a portion of the plurality of interstitial regions including the metal-solvent catalyst disposed therein. The method further includes at least partially leaching the PCD table to remove at least a portion of the metal-solvent catalyst therefrom to form an at least partially leached PCD table. The method additionally includes subjecting the at least partially leached PCD table and a substrate to a second HPHT process under diamond-stable temperature-pressure conditions effective to at least partially infiltrate the at least partially leached PCD table with an alloy infiltrant comprising a cobalt-boron-silicon alloy infiltrant.

In an embodiment, a PDC is disclosed. The PDC includes a cemented carbide substrate and a preformed PCD table attached to the substrate. The preformed PCD table includes a plurality of bonded diamond grains defining a plurality of interstitial regions. At least a portion of the plurality of interstitial regions includes including a cobalt-boron-silicon alloy infiltrant therein.

Other embodiments include applications employing the disclosed PDCs in various articles and apparatuses, such as rotary drill bits, bearing apparatuses, machining equipment, and other articles and apparatuses. Other embodiments include methods of fabricating such articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Figure 1A:
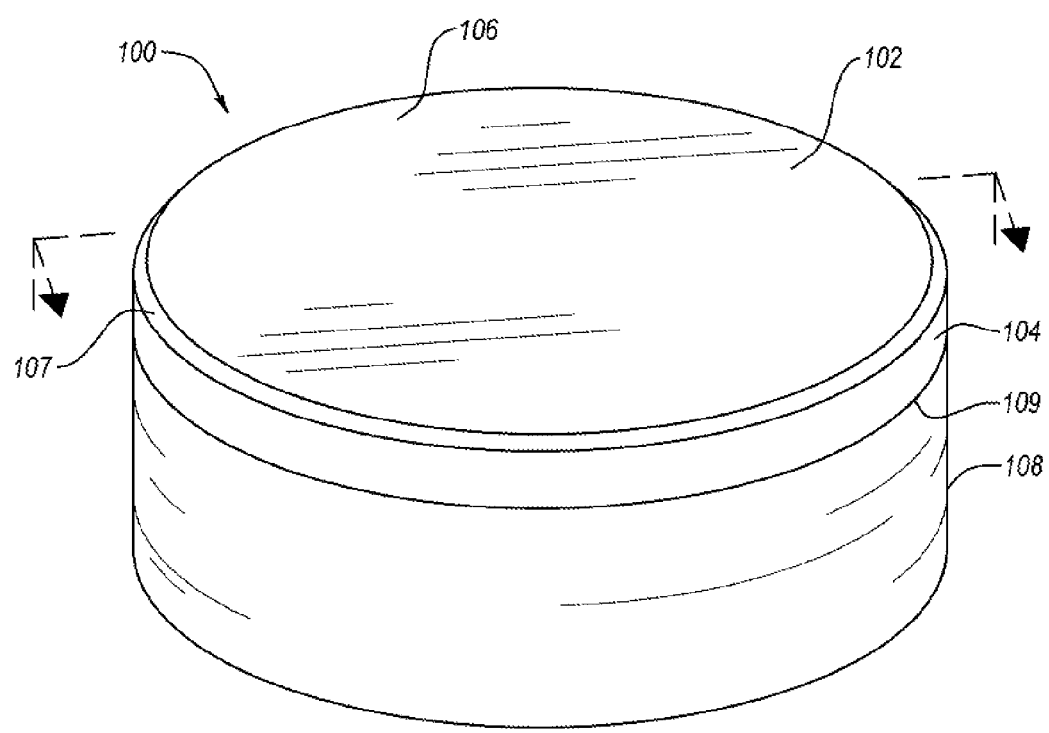
FIG. 1A is an isometric view of an embodiment of a PDC.

Embodiments of the invention relate to PDCs and methods of manufacturing such PDCs. Generally, embodiments relate to methods of forming an at least partially leached PCD table and bonding the at least partially leached PCD table to a substrate with an alloy infiltrant exhibiting a selected viscosity. For example, such methods may enable relatively substantially complete infiltration of the at least partially leached PCD table.

More specifically, an at least partially leached PCD table (i.e., a porous, pre-sintered PCD table) may be provided. The at least partially leached PCD table may be fabricated by subjecting a plurality of diamond particles (e.g., diamond particles having an average particle size between 0.5 μm to about 150 μm) to an HPHT sintering process in the presence of a catalyst, such as cobalt, nickel, iron, or an alloy of any of the preceding metals to facilitate intergrowth between the diamond particles and form a PCD table comprising bonded diamond grains defining interstitial regions having the catalyst disposed within at least a portion of the interstitial regions. The as-sintered PCD table may be leached by immersion in an acid or subjected to another suitable process to remove at least a portion of the catalyst from the interstitial regions of the PCD table and form the at least partially leached PCD table. The at least partially leached PCD table includes a plurality of interstitial regions that were previously occupied by a catalyst and form a network of at least partially interconnected pores. In an embodiment, the sintered diamond grains of the at least partially leached PCD table may exhibit an average grain size of about 20 μm or less.

Subsequent to leaching the PCD table, the at least partially leached PCD table may be bonded to a substrate in an HPHT process via an infiltrant with a selected viscosity. For example, an infiltrant may be selected that exhibits a viscosity that is less than a viscosity typically exhibited by a cobalt and/or nickel cementing constituent of typical cobalt-cemented and/or nickel-cemented tungsten carbide substrates (e.g., 8% cobalt-cemented tungsten carbide to 13% cobalt-cemented tungsten carbide). Such an infiltrant may be selected to have a lower viscosity than the cementing constituent of the substrate to which the at least partially leached PCD table is to be bonded and may have a similar or identical crystal structure as the cementing constituent of the substrate. For example, a cobalt-boron-silicon infiltrant, a cobalt-boron infiltrant, and/or a cobalt-silicon infiltrants may more closely match the crystal structure of the cobalt material (e.g., from the cementing constituent from the substrate used to form the PCD table) present in the interstitial regions of the PCD table and/or substrate. Closely matching infiltrant and binder (e.g., cementing constituent and/or metal solvent catalyst) combinations may provide closer characteristics, such as coefficients of thermal expansion, leach depths, etc., to the PCD table having those materials therein. In contrast, a cobalt-based binder material present in a PCD table may have a hexagonal close packed configuration while a nickel-based alloy infiltrant may have a face-centered cubic crystal structure, which may lead to increased failure in PCD tables having both.

Such an infiltrant having a reduced viscosity may result in an effective and/or complete infiltration/bonding of the at least partially leached PCD table to the substrate during the HPHT process. The infiltrant may comprise, for example, one or more metals or alloys of one or more metals. For example, an infiltrant exhibiting a selected viscosity may comprise cobalt, nickel, iron, molybdenum, copper, silver, gold, titanium, vanadium, chromium, manganese, niobium, technetium, hafnium, tantalum, tungsten, rhenium, ruthenium, rhodium, palladium, osmium, iridium, platinum, alloys thereof, mixtures thereof, or combinations thereof without limitation. Such an infiltrant may be present within a metal-cemented substrate or may be formed with another material during an HPHT process for bonding a PCD table to the metal-cemented substrate.

In some embodiments, a viscosity of an alloy infiltrant (e.g., cobalt, nickel, iron, or alloys thereof) may be decreased by alloying with at least one eutectic forming alloying constituent in an amount at or near a eutectic composition for the alloy—at least one eutectic forming alloying constituent system. As used herein, "a cobalt-based alloy" may refer to a cobalt alloy having at least 50% by weight (wt %) cobalt. As used herein, "a nickel-based alloy" may refer to a nickel alloy having at least 50% by weight nickel. A PCD table can exhibit relatively low porosity, which can make it difficult for an infiltrant from a substrate or other source to effectively infiltrate and penetrate into the PCD table for bonding the PCD table to a substrate. Insufficient penetration may occur when a preformed PCD table is to be bonded to a carbide substrate, and the preformed PCD table was formed under exceptionally high pressure conditions (e.g., at least about 7.5 GPa cell pressure). Theoretically, depth of infiltration of the infiltrant is inversely proportional to the viscosity of the infiltrant, among other variables. Attempting to attach a PCD table having extremely fine porosity to a substrate using pure cobalt or pure nickel can result in insufficient depth of penetration, which can later lead to delamination of the PCD table from the substrate and/or chipping of the PCD table during use. Increasing the processing temperature at which attachment occurs (which would decrease the viscosity of the cobalt or nickel) can result in damage (e.g., increased back conversion of the diamond) to the preformed PCD table.

Figure 1B:
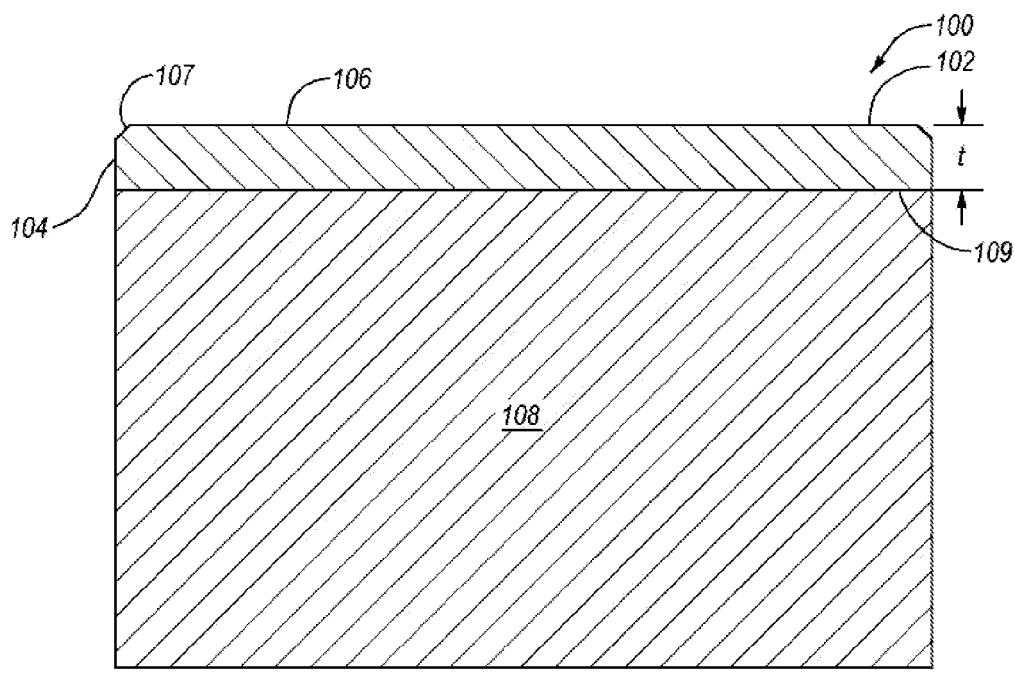
FIG. 1B is a cross-sectional view of a PDC of FIG. 1A.

FIGS. 1A and 1B are isometric and cross-sectional views, respectively, of an embodiment of a PDC 100 including a preformed PCD table 102 attached to a cemented carbide substrate 108 along an interfacial surface 109 thereof. The PCD table 102 includes a plurality of directly bonded-together diamond grains exhibiting diamond-to-diamond bonding (e.g., sp³ bonding) therebetween, which define a plurality of interstitial regions. A cobalt-based alloy infiltrant and/or nickel-based alloy infiltrant provided from the cemented carbide substrate 108 is disposed within at least some of the interstitial regions of PDC table 102. As will be discussed in more detail below, the cobalt-based alloy infiltrant and/or nickel-based alloy infiltrant includes cobalt and/or nickel and at least one eutectic forming alloying constituent, and may have a composition at or near a eutectic composition for a system of cobalt and/or nickel and the at least one eutectic forming alloying constituent. As used herein, a composition that is "at or near a eutectic composition of the cobalt-based alloy" or "at or near the eutectic composition of the cobalt-based alloy" may include 0.1 to 2 times (e.g., about 0.4 to about 1.5 times, about 0.7 to about 1.2 times, or about 0.9 to about 1.1 times) the eutectic composition with respect to the eutectic forming alloying constituent. Similarly, as used herein, a composition that is "at or near a eutectic composition of the nickel-based alloy" or "at or near the eutectic composition of the nickel-based alloy" may include 0.1 to 2 times (e.g., about 0.4 to about 1.5 times, about 0.7 to about 1.2 times, or about 0.9 to about 1.1 times) the eutectic composition with respect to the eutectic forming alloying constituent. Thus, the alloy infiltrant having a composition that is at or near a eutectic composition may be at a eutectic composition, may be hypo-eutectic, or may be hyper-eutectic.

The PCD table 102 includes at least one lateral surface 104, an upper exterior working surface 106, and an optional chamfer 107 extending therebetween. It is noted that at least a portion of the at least one lateral surface 104 and/or the chamfer 107 may also function as a working surface that contacts a subterranean formation during drilling operations. Additionally, although the interfacial surface 109 is illustrated as being substantially planar, in other embodiments, the interfacial surface 109 may exhibit a selected nonplanar topography. In such embodiments, the PCD table 102 may also exhibit a correspondingly configured nonplanar interfacing topography.

The bonded-together diamond grains of the PCD table may exhibit an average grain size of about 100 μm or less, about 40 μm or less, such as about 30 μm or less, about 25 μm or less, or about 20 μm or less. For example, the average grain size of the diamond grains may be about 10 μm to about 18 μm, about 8 μm to about 15 μm, about 9 μm to about 12 μm, or about 15 μm to about 25 μm. In some embodiments, the average grain size of the diamond grains may be about 10 μm or less, such as about 2 μm to about 5 μm or submicron.

Referring to FIG. 1B, the PCD table 102 may exhibit a thickness "t" of at least about 0.040 inch, such as about 0.045 inch to about 0.150 inch, about 0.050 inch to about 0.120 inch, about 0.065 inch to about 0.100 inch, or about 0.070 inch to about 0.090 inch. The PCD table 102 may include a single region with similar characteristics throughout the thickness "t" of the PCD table 102.

Figure 1C:
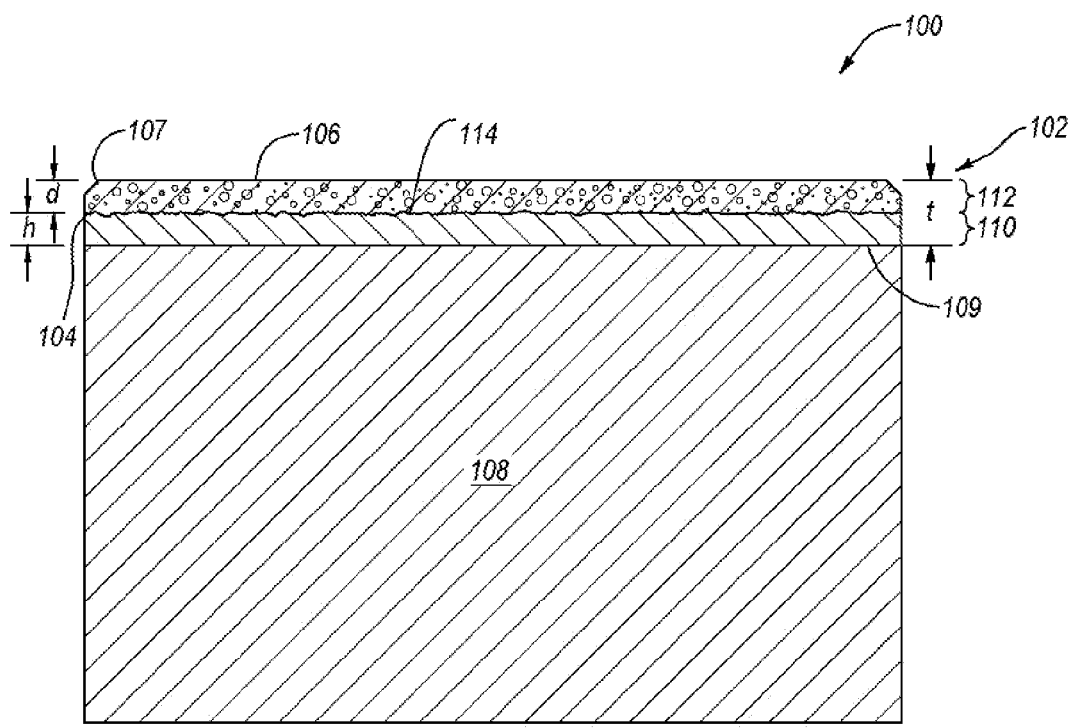
FIG. 1C is a cross-sectional view of a PDC similar to that of FIG. 1A in which the PCD table is only partially infiltrated by the cobalt-based and/or nickel-based alloy infiltrant.

Referring to FIG. 1C, according to another embodiment, the PCD table 102 may include a first region 110 adjacent to the cemented carbide substrate 108 that extends from the interfacial surface 109 an average selected infiltration distance "h" and includes the cobalt-based alloy infiltrant disposed in at least a portion of the interstitial regions thereof. The PCD table 102 may include a second region 112 that extends inwardly from the working surface 106 to an average selected depth "d." The depth "d" may be at least about 200 μm, at least about 500 μm, about 500 μm to about 2100 μm, about 750 μm to about 2100 μm, about 950 μm to about 1500 μm, about 1000 μm to about 1750 μm, about 1000 μm to about 2000 μm, about 1500 μm to about 2000 μm, at least about a third of the thickness of the PCD table 102, about half of the thickness of the PCD table 102, or at least about more than half of the thickness of the PCD table 102. The interstitial regions of the second region 112 are substantially free of the cobalt-based alloy infiltrant and/or the nickel-based alloy infiltrant. As explained in more detail below, in some embodiments, the interstitial regions of the second region 112 may be filled with a second infiltrant, such as a silicon-containing infiltrant, an aluminum containing infiltrant, or a copper-containing infiltrant.

Such a two-region configuration for the PCD table 102 may be formed when bonding the PCD table 102 to the cemented carbide substrate 108 in a second, subsequent HPHT process by limiting infiltration of the cobalt-based alloy infiltrant and/or the nickel-based alloy infiltrant so that infiltration only extends part way through the depth of the PCD table 102. Such limitation of infiltration may be accomplished by controlling the amount of infiltrant(s) used, controlling the HPHT conditions and/or duration, and/or infiltrating another material (e.g., a second infiltrant) into one or more regions of the PCD table 102. For example, a sacrificial second infiltrant (e.g., copper), composed to more easily leach from the interstitial regions of the PCD table 102, may be infiltrated from the working surface 106 of the PCD table 102 during the second HPHT process. The second infiltrant provided for a closer match in coefficients of thermal expansion to PCD and/or faster/easier/more complete leaching may be provided from a metallic foil, powder, paste, powder mixture, or other insert provided between the cemented carbide substrate 108 and the PCD table 102, or positioned above PDC table 102 during infiltration and attachment of the PCD table 102 to the substrate 108. Second infiltrant materials and methods of using the same suitable for use with the PCD tables herein are disclosed in U.S. patent application Ser. No. 13/795,027 filed 12 Mar. 2013, the disclosure of which is incorporated herein, in its entirety, by this reference.

In another embodiment, when the cobalt-based alloy infiltrant and/or nickel-based alloy infiltrant infiltrates substantially to the working surface 106, a similar two-region configuration can be achieved by leaching the PCD table similar to that shown in FIG. 1B to remove cobalt-based alloy infiltrant and/or nickel-based alloy infiltrant from second region 112 to a selected depth from the working surface 106. Leaching may be accomplished with a suitable acid, such as aqua regia, nitric acid, hydrofluoric acid, or mixtures thereof. Leaching may alternatively or additionally be accomplished using electrochemical leaching techniques, such as any of those disclosed in U.S. Provisional Patent Application Nos. 62/096,315 filed 23 Dec. 2014 and 62/187,574 filed 1 Jul. 2015, the disclosure of each of which is incorporated herein, in its entirety, by this reference. For example, PCD tables containing silicon (e.g., from a cobalt-boron-silicon infiltrant, a cobalt-boron infiltrant, or a cobalt-silicon infiltrant) may be leached (e.g., to a selected depth or degree) with electrochemical leaching and/or immersion leaching.

As explained, in another embodiment, such a configuration may be formed in a two-step process by providing an at least partially leached PCD table, and then attaching the at least partially leached PCD table to the cemented carbide substrate 108 in a subsequent HPHT process. The HPHT process parameters may be selected so that the cobalt-based alloy infiltrant and/or nickel-based alloy infiltrant (e.g., from the cemented carbide substrate 108) sweeps into the first region 110 adjacent to the PCD table 102. Where full infiltration is desired, the resulting configuration may be as shown in FIG. 1B. Infiltration may only be partial, resulting in a configuration as shown in FIG. 1C. Such partial infiltration may be accomplished by selectively controlling the HPHT conditions and/or duration, or by using a second infiltrant.

In an embodiment, the first infiltrant (e.g., a cobalt-based alloy infiltrant and/or nickel-based alloy infiltrant provided from the cemented carbide substrate 108, foil or disc between the substrate and the PCD table 102, or from another source) may be disposed within at least some of the interstitial regions of a first region of the PDC table 102 adjacent to the cemented carbide substrate 108 (e.g., a region extending inwardly from the interfacial surface 109 to an intermediate depth), and the second infiltrant (e.g., a copper infiltrant provided from a foil, powder, or disc) may be disposed within at least some of the interstitial regions of a second region 112 of the PCD table 102 remote from the cemented carbide substrate 108 (e.g., a region extending inwardly from the exterior working surface 106 to an intermediate depth). The first infiltrant may include any of those cobalt-based alloying infiltrants, nickel-based alloying infiltrants, or combinations of the foregoing disclosed herein. The second infiltrant may be configured with an identical, similar, or lower melting point than the first infiltrant to infiltrate prior to or substantially simultaneously with the first infiltrant. In such embodiments, the second infiltrant may substantially prevent or limit the first infiltrant from infiltrating into or past those interstitial spaces occupied by the second infiltrant. PCD tables formed in such a manner may exhibit one or more distinct regions having at least a greater portion of the first or second infiltrant therein. In an embodiment, the first and second infiltrants may form an alloy, which may have a composition that varies throughout a thickness of the preformed PCD table 102 or forms a concentration gradient in at least one region of the PCD table 102. For example, the resultant alloy formed from the first and second infiltrants may comprise at least one of nickel or cobalt; at least one of carbon, silicon, boron, phosphorus, cerium, tantalum, titanium, niobium, molybdenum, antimony, tin, or carbides thereof; and at least one of magnesium, lithium, tin, silver, copper, nickel, zinc, germanium, gallium, antimony, bismuth, or gadolinium. It should be noted that depending on the amount of the first and second infiltrants and the geometry of the PCD table 102, a third infiltrant, such as from the cemented carbide substrate portion 108 (e.g., cobalt from a cobalt-cemented tungsten carbide substrate), may also infiltrate into the PCD table 102 following the first and second infiltrants and occupy a region of the PCD table 102 adjacent to the cemented carbide substrate 108.

As the PCD table 102 may be fabricated from an at least partially leached PCD table that was subsequently partially infiltrated with the cobalt-based alloy infiltrant and/or nickel-based alloy infiltrant, the second region 112 may still include some residual metal-solvent catalyst used to initially form the diamond-to-diamond bonds in the PCD table 112 that was not removed in the leaching process. For example, the residual metal-solvent catalyst in the interstitial regions of the second region 112 may be about 0.5% to about 2% by weight, such as about 0.9% to about 1% by weight. Even with the residual amount of the metal-solvent catalyst in the second region 112, the interstitial regions of the second region 112 may still be considered to be substantially void of material. The residual metal-solvent catalyst within second region 112 may be the same or different from the infiltrant used to attach PCD table 102 to substrate 108. For example, in an embodiment, the residual metal-solvent catalyst present within second region 112 may be cobalt, while a cobalt-based alloy infiltrant and/or nickel-based alloy infiltrant is interstitially present within first region 110.

The cobalt-based alloy infiltrant and/or nickel-based alloy infiltrant present in the interstitial regions of the PCD table 102 may be provided at least partially or substantially completely from the cementing constituent of the cemented carbide substrate 108, or provided from another source such as a metallic foil, powder, powder mixture, or a disc or generally conical member that is provided between the cemented carbide substrate 108 and the PCD table 102 when reattaching the PCD table 102 to another substrate. Configurations employing a disc or generally conical member are described below in conjunction with FIGS. 3A-3C.

The cemented carbide substrate 108 comprises a plurality of tungsten carbide and/or other carbide grains (e.g., tantalum carbide, vanadium carbide, niobium carbide, chromium carbide, titanium carbide, or combinations thereof) cemented together with a cobalt-based alloy infiltrant alloyed with at least one eutectic forming alloying constituent (i.e., at least one constituent that is capable of forming a eutectic system with cobalt) and/or a nickel-based alloy infiltrant alloyed with at least one eutectic forming alloying constituent (i.e., at least one constituent that is capable of forming a eutectic system with nickel). Cobalt alloy, nickel alloy, and cobalt-nickel alloy cementing constituents suitable for use in the cemented carbide substrates herein are disclosed in U.S. Pat. No. 8,727,045, the disclosure of which is incorporated herein, in its entirety, by this reference. In an embodiment, the alloying constituent may be present in elemental form. In another embodiment, the alloying constituent may be present as a compound (e.g., a carbide of a given alloying constituent in elemental form). In some embodiments, the cemented carbide substrate 108 may include two or more different carbides (e.g., tungsten carbide and tantalum carbide).

In some embodiments, the cemented carbide grains of the substrate 108 may exhibit an average grain size of about 30 μm or larger, such as about 30 μm to about 100 μm, about 40 μm to about 80 μm, or less than about 200 μm. In some embodiments, the average cemented carbide grain size of the substrate 108 may be relatively fine, such as 3 μm or less or 1.5 μm or less. Relatively fine grain carbide substrates suitable for use in the substrate 108 are disclosed in U.S. patent application Ser. No. 13/954,545 filed 30 Jul. 2013 and Ser. No. 14/539,015 filed 12 Nov. 2014, the disclosure of each of which is incorporated herein, in its entirety, by this reference. It is currently believed that finer average carbide grain sizes in the substrate 108 may slow or limit infiltration of material (e.g., cobalt or nickel-based alloy infiltrants) into the substrate compared to substrates exhibiting relatively larger average carbide grain sizes. In some embodiments, where deeper infiltration into the substrate 108 from an outside source (e.g., a cobalt-boron-silicon alloy, cobalt-boron alloy, and/or cobalt-silicon alloy foil, powder, or disk) is desired, the cemented carbide substrate 108 may be formed substantially of cemented carbide grains having an average carbide grain size of about 3 μm or greater, such as about 5 μm or greater, about 10 μm or greater, about 20 μm or greater, about 30 μm or greater, or about 50 μm or greater. Such embodiments of cemented carbide substrates 108 may be used for bonding a preformed PCD table 102 to the substrate 108 using a source of cobalt-based alloy, nickel-based alloy, or combinations of the foregoing disposed therebetween. In some embodiments, sources may include a foil, a powder, or a disc. During HPHT processing, the cobalt and/or nickel-based alloy infiltrant may melt (e.g., prior to the cementing constituent in the substrate melting, due at least in part to the eutectic forming alloying constituent(s) in the cobalt and/or nickel-based alloy(s)) and infiltrate into both the PCD table and the substrate. Upon cooling, the cobalt and/or nickel-based alloy infiltrant in the interstitial spaces between the bonded diamond grains and cemented carbide grains may bond the PCD table 102 to the substrate 108. The at least one eutectic forming alloying constituent present in the cobalt-based and/or nickel-based alloy infiltrant of the cemented carbide substrate 108 and/or the interstitial regions of the PCD table 102 may be any suitable constituent that can form a eutectic composition with cobalt and/or nickel and may present in an amount at or near a eutectic composition for the cobalt—at least one eutectic forming alloy constituent system and/or nickel—at least one eutectic forming alloy constituent system. Examples for the at least one eutectic forming alloying constituent for cobalt-based alloy infiltrants include, but are not limited to, carbon, silicon, boron, phosphorus, tantalum, niobium, molybdenum, antimony, tin, titanium, carbides thereof (e.g., tantalum or titanium carbide), and combinations thereof. Examples for the at least one eutectic forming alloying constituent for nickel-based alloy infiltrants include, but are not limited to, carbon, silicon, boron, phosphorus, cerium, tantalum, niobium, molybdenum, antimony, tin, titanium, carbides thereof, and combinations thereof.

The microstructure of the cobalt-based and/or nickel-based alloy infiltrant in the cemented carbide substrate 108 and the interstitial regions of the PCD table 102 may be characteristic of a eutectic system, such as exhibiting a multiphase lamellar microstructure of the two dominant phases. It should be noted that the composition and/or microstructure of the cobalt-based and/or nickel-based alloy infiltrant in the cemented carbide substrate 108 may be the substantially the same as the cobalt-based and/or nickel-based alloy infiltrant in the PCD table 102, or may be slightly different due to incorporation of some carbon from the diamond grains of the PCD table 102 into the cobalt-based and/or nickel-based alloy infiltrant present in the PCD table 102 during HPHT infiltration and incorporation of other constituents from the cemented carbide substrate 108 (e.g., tungsten and/or tantalum carbide) in the cobalt-based and/or nickel-based alloy infiltrant in the cemented carbide substrate 108 or from other sources.

The amount of the at least one eutectic forming alloying constituent in solid solution with cobalt and/or nickel in the cobalt-based alloy infiltrant at room temperature is typically far less than at or near the eutectic composition of the cobalt-based and/or nickel-based alloy at room temperature because of the low solid solubility of the at least one eutectic forming alloying constituent in cobalt and/or nickel at room temperature. In such a scenario, the cobalt-based and/or nickel-based alloy infiltrant may include a cobalt and/or nickel solid solution phase and at least one additional phase including the at least one eutectic forming alloying constituent, such as a substantially pure elemental phase, an alloy phase with another chemical element, one or more types of carbides, one or more types of borides, one or more types of phosphides, another type of chemical compound, or combinations of the foregoing. However, the overall composition of the cobalt-based and/or nickel-based alloy infiltrant of the cemented carbide substrate 108 and/or the PCD table 102 may still be at or near the eutectic composition. In another embodiment, the at least one eutectic forming alloying constituent may be present in an amount effective to reduce the liquidus temperature at standard pressure to not more than 1450° C., not more than about 1400° C., not more than about 1350° C., or not more than about 1300° C.

For example, the cemented carbide substrate 108 may include about 1% by weight silicon (about 7.1% by weight of the cobalt-based alloy infiltrant cementing constituent), about 13% by weight cobalt, and about 86% by weight tungsten carbide. Similar weight fractions may be employed when substituting nickel for cobalt. First, silicon, tungsten carbide, and cobalt and/or nickel particles may be milled together to form a mixture. The mixture so-formed may be sintered to form the cemented carbide substrate 108. However, the cobalt-based and/or nickel-based alloy infiltrant that serves as a cementing constituent of the cemented carbide substrate 108 may not have 7.1% by weight of silicon in solid solution with cobalt and/or nickel because some of the silicon of the cobalt-based or nickel-based alloy infiltrant may be in the form of a substantially pure silicon phase, a silicon alloy phase, a silicide, silicon carbide, or combinations thereof. However, when the cemented carbide substrate 108 is used as a source for the cobalt-based and/or nickel-based alloy infiltrant to infiltrate an at least partially leached PCD table in an HPHT process, the silicon that is not in solid solution with cobalt and/or nickel dissolves in the liquefied cobalt-based and/or nickel-based alloy infiltrant during HPHT processing because the HPHT processing temperature is typically well above the eutectic temperature for the cobalt-silicon and/or nickel-silicon system.

Use of a cobalt-based and/or nickel-based alloy infiltrant rather than cobalt and/or nickel alone reduces the liquidus temperature of the cobalt-based and/or nickel-based alloy infiltrant as compared to cobalt and/or nickel alone. This lowers the melting point and viscosity of the cobalt-based and/or nickel-based alloy infiltrant, providing for improved infiltration of the cobalt-based and/or nickel-based alloy infiltrant into the finely porous structure of the PCD table 102 during attachment of the cemented carbide substrate 108 to the PCD table 102. This reduction in the viscosity at the sintering temperature is particularly beneficial when used with the PCD table 102 exhibiting relatively low porosity prior to infiltration as a result of being formed under exceptionally high pressure conditions (e.g., at least about 7.5 GPa cell pressure). As a practical matter, full infiltration may reduce a tendency of the PCD table 102 to delaminate from the cemented carbide substrate 108 and/or chip. The melting temperature of pure cobalt at standard pressure conditions is about 1495° C. The addition of the at least one eutectic forming alloying constituent may decrease the liquidus temperature at standard pressure to not more than about 1400° C., not more than about 1350° C., or not more than about 1300° C.

The melting temperature of pure nickel at standard pressure conditions is about 1455° C. The addition of the at least one eutectic forming alloying constituent may decrease the liquidus temperature at standard pressure to not more than 1450° C., not more than about 1400° C., not more than about 1350° C., not more than about 1300° C., not more than about 1250° C., or not more than about 1200° C.

Cobalt-Based Alloy Infiltrants

Cobalt-silicon is an embodiment of a cobalt-based alloy for the cobalt-based alloy infiltrant that forms a eutectic composition at particular weight fractions of cobalt and silicon. For example, the cobalt-silicon phase diagram includes a eutectic composition at about 12.5% silicon by weight. By way of example, the amount of silicon in the cobalt-based alloy infiltrant may be about 12.5%, less than about 12.5%, about 5% to about 18.75%, about 1% to about 4%, about 1% to about 2.5%, about 2% to about 8%, about 3% to about 7%, about 3% to about 5%, about 1% to about 2%, about 2% to about 3%, about 3% to about 4%, about 0.5% to about 1%, about 0.5% to about 1.5%, about 0.25% to about 1%, or about 0.1% to about 0.6% less than about 5%, less than about 4%, less than about 3%, less than about 2%, or less than about 1% silicon by weight of the cobalt-based alloy infiltrant. At the eutectic composition, the liquidus temperature of the cobalt-silicon alloy is decreased from 1495° C. to about 1195° C. When employing the cobalt-silicon alloy as the cobalt-based alloy infiltrant, there may be a tendency for the silicon to consume diamond, forming silicon carbide at the expense of diamond-to-diamond bonding. In order to limit this tendency, in an embodiment, it is not necessary to include such a high fraction of silicon to decrease the liquidus temperature and viscosity to the desired degree, as any amount up to the eutectic composition may be used. In another embodiment, the amount may be effective to reduce the liquidus temperature at standard pressure to not more than about 1400° C., not more than about 1350° C., not more than about 1300° C., or not more than about 1200° C. It is currently believed that limiting the amount of silicon may also limit formation of silicon carbide at the expense of diamond-to-diamond bonding during HPHT infiltration of the cobalt-based alloy infiltrant.

Depending upon the fabrication technique used to form the cemented carbide substrate 108, the cobalt-based alloy infiltrant of the cemented carbide substrate 108 may have less than about 12.5% by weight silicon in solid solution with cobalt, but silicon may be present in the cobalt-based alloy infiltrant in the form of a substantially pure silicon phase, a silicon alloy phase, a silicide, silicon carbide, or combinations thereof. In other embodiments, substantially all of the silicon in the cemented carbide substrate 108 may be in solid solution with cobalt of the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-silicon system, but not all of the silicon may be in solid solution with the cobalt of the cobalt-based alloy infiltrant and may be present as substantially pure silicon, an alloy of silicon, silicon carbide, or combinations thereof. Regardless of whether the silicon that is not in solid solution with cobalt is considered part of (e.g., as in a multiphase cobalt-based alloy having two or more phases) or distinct from the cobalt-based alloy infiltrant in the PCD table 102, the total amount of silicon in the PCD table 102 by weight of the cobalt-based alloy infiltrant may still be at or near the eutectic composition of the cobalt-silicon system.

Cobalt-carbon is another embodiment of a cobalt-based alloy for the cobalt-based alloy infiltrant that forms a eutectic composition. The cobalt-carbon phase diagram includes a eutectic composition at about 2.9% weight of carbon. By way of example, the amount of carbon in the cobalt-based alloy infiltrant may be less than about 2.9%, about 1.45% to about 4.35%, about 1% to less than 2.9%, about 0.5% to about 2.5%, about 1% to about 2%, about 0.75% to about 1.5%, about 0.5% to about 1.5%, less than about 1%, less than about 0.5%, or less than about 0.25% carbon by weight of the cobalt-based alloy infiltrant. In another embodiment, the amount may be effective to reduce the liquidus temperature at standard pressure to not more than about 1400° C., not more than about 1350° C., or not more than about 1300° C. At the eutectic composition, the liquidus temperature of the cobalt-carbon alloy is decreased from 1495° C. to about 1309° C.

Depending upon the fabrication technique used to form the cemented carbide substrate 108, the cobalt-based alloy infiltrant of the cemented carbide substrate 108 may have less than about 2.9% by weight carbon, but carbon may be present in the cobalt-based alloy infiltrant in another form, such as in the form of carbon rich carbide phases, graphite, or combinations thereof. In other embodiments, the cobalt-based alloy infiltrant may have carbon present therein at or near the eutectic composition thereof in a supersaturated metastable state. Likewise, the cobalt-based alloy infiltrant present in the interstitial regions of the PCD table 102 may exhibit a composition at or near the eutectic composition for the cobalt-carbon system, but not all of the carbon may be in solid solution with the cobalt of the cobalt-based alloy infiltrant and may be present as graphite. Regardless of whether the carbon that is not in solid solution with cobalt is considered part of or distinct from the cobalt-based alloy infiltrant in the PCD table 102, the total amount of non-diamond carbon in the PCD table 102 by weight of the cobalt-based alloy infiltrant may still be at or near the eutectic composition of the cobalt-carbon system.

Cobalt-boron is another embodiment of a cobalt-based alloy for the cobalt-based alloy infiltrant that forms a eutectic composition. The cobalt-boron phase diagram includes a eutectic composition at about 5.5 weight percent boron. By way of example, the amount of boron in the cobalt-based alloy infiltrant may be less than 12.5%, about 5.5%, about 5% to about 18.75%, about 1% to about 4%, about 1% to about 2.5%, about 2% to about 8%, about 3% to about 7%, about 3% to about 5%, about 1% to about 2%, about 2% to about 3%, about 3% to about 4%, about 0.5% to about 1%, about 0.5% to about 1.5%, about 0.25% to about 1%, or about 0.1% to about 0.6%, less than about 5.5%, less than about 5%, less than about 4%, less than about 3%, less than about 2%, or less than about 1% by weight of the cobalt-based alloy infiltrant. At the eutectic composition, the liquidus temperature of the cobalt-boron alloy is decreased from 1495° C. to about 1102° C. Similar to cobalt-silicon, with cobalt-boron there may be a tendency for the boron to consume diamond, forming boron carbide at the expense of diamond-to-diamond bonding. Similar to the other eutectic forming alloying constituents, it may not be necessary to include such a high fraction of boron to achieve the desired decrease in melting temperature and viscosity. In another embodiment, the amount of boron may be effective to reduce the liquidus temperature at standard pressure to not more than about 1400° C., not more than about 1350° C., not more than about 1300° C., or not more than about 1200° C.

Depending upon the fabrication technique used to form the cemented carbide substrate 108, the cobalt-based alloy infiltrant of the cemented carbide substrate 108 may have less than about 5.5% by weight boron, but boron may be present in the cobalt-based alloy infiltrant that is not in solid solution with cobalt in the form of a substantially pure boron, boron carbide, one or more types of borides, or combinations thereof. In other embodiments, substantially all of the boron in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-boron system, but not all of the boron may be in solid solution with the cobalt of the cobalt-based alloy infiltrant and may be present as substantially pure boron, boron carbide, one or more types of borides, or combinations thereof. Regardless of whether the boron that is not in solid solution with cobalt is considered part of (e.g., as in a multiphase cobalt-based alloy having two or more phases) or distinct from the cobalt-based alloy infiltrant in the PCD table 102, the total amount of boron in the PCD table 102 by weight of the cobalt-based alloy infiltrant may still be at or near the eutectic composition of the cobalt-boron system.

Cobalt-phosphorus is another embodiment of a cobalt-based alloy for the cobalt-based alloy infiltrant that forms a eutectic composition. The cobalt-phosphorus phase diagram includes a eutectic composition at about 11.5 weight percent phosphorus. By way of example, the amount of phosphorus in the cobalt-based alloy infiltrant may be less than 11.5%, about 4.6% to about 17.3%, about 1% to about 8%, about 7% to about 9%, about 5% to about 8%, about 3% to about 6%, less than about 3%, less than about 2%, less than about 1%, or about 0.5% to about 1.5% phosphorus by weight of the cobalt-based alloy infiltrant. In another embodiment, the amount may be effective to reduce the liquidus temperature at standard pressure to not more than about 1400° C., not more than about 1350° C., not more than about 1300° C., or not more than about 1200° C. At the eutectic composition, the liquidus temperature of the cobalt-phosphorus alloy is decreased from 1495° C. to about 1023° C.

Depending upon the fabrication technique used to form the cemented carbide substrate 108, the cobalt-based alloy infiltrant of the cemented carbide substrate 108 may have less than about 11.5% by weight phosphorus, but phosphorus may be present in the cobalt-based alloy infiltrant that is not in solid solution with cobalt in the form of a substantially pure phosphorous, one or more types of phosphides, or combinations thereof. In other embodiments, substantially all of the phosphorus in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-phosphorus system, but not all of the phosphorus may be in solid solution with the cobalt of the cobalt-based alloy infiltrant and may be present as substantially pure phosphorous, one or more types of phosphides, or combinations thereof. Regardless of whether the phosphorus that is not in solid solution with cobalt is considered part of (e.g., as in a multiphase cobalt-based alloy having two or more phases) or distinct from the cobalt-based alloy infiltrant in the PCD table 102, the total amount of phosphorus in the PCD table 102 by weight of the cobalt-based alloy infiltrant may still be at or near the eutectic composition of the cobalt-phosphorus system.

Cobalt-tantalum is another embodiment of a cobalt-based alloy for the cobalt-based alloy infiltrant that forms a eutectic composition. The cobalt-tantalum phase diagram includes a eutectic composition at about 32.4 weight percent tantalum. By way of example, the amount of tantalum in the cobalt-based alloy infiltrant may be less than 32.4%, about 13% to about 49%, about 10% to about 30%, about 15% to about 25%, about 5% to about 15%, about 3% to about 6%, less than about 10%, less than about 5%, less than about 3%, or about 0.5% to about 1.5% tantalum by weight of the cobalt-based alloy infiltrant. At the eutectic composition, the liquidus temperature of the cobalt-tantalum alloy is decreased from 1495° C. to about 1276° C. Similar to cobalt-silicon, with cobalt-tantalum there may be a tendency for the tantalum to consume diamond, forming tantalum carbide at the expense of diamond-to-diamond bonding. In embodiment, the amount may be effective to reduce the liquidus temperature at standard pressure to not more than about 1400° C., not more than about 1350° C., or not more than about 1300° C. Similar to the other eutectic forming alloying constituents, it may not be necessary to include such a high fraction of tantalum to achieve the desired decrease in melting temperature and viscosity. In other embodiment, any of the foregoing ranges for tantalum may be used for tantalum carbide or combinations of tantalum and tantalum carbide.

Depending upon the fabrication technique used to form the cemented carbide substrate 108, the cobalt-based alloy infiltrant of the cemented carbide substrate 108 may have less than about 32.4% by weight tantalum, but tantalum may be present in the cobalt-based alloy infiltrant that is not in solid solution with cobalt in the form of a substantially pure phase of tantalum, an alloy phase of tantalum, tantalum carbide, or combinations thereof. In other embodiments, substantially all of the tantalum in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-tantalum system, but not all of the tantalum may be in solid solution with the cobalt of the cobalt-based alloy infiltrant and may be present as substantially pure tantalum, an alloy of tantalum, tantalum carbide, or combinations thereof. Regardless of whether the tantalum that is not in solid solution with cobalt is considered part of (e.g., as in a multiphase cobalt-based alloy having two or more phases) or distinct from the cobalt-based alloy infiltrant in the PCD table 102, the total amount of tantalum in the PCD table 102 by weight of the cobalt-based alloy infiltrant may still be at or near the eutectic composition of the cobalt-tantalum system.

An embodiment may include more than one of the foregoing eutectic forming alloying constituents. For example, an alloy and/or mixture of cobalt and tantalum carbide may be particularly beneficial as may provide high lubricity, better high temperature performance (because tantalum is a refractory metal), and may limit any tendency of tantalum alone to consume diamond in the formation of tantalum carbide, as the tantalum instead is already provided in the form of tantalum carbide.

Cobalt-niobium is another embodiment of a cobalt-based alloy for the cobalt-based alloy infiltrant that forms a eutectic composition. The cobalt-niobium phase diagram includes a eutectic composition at about 21 weight percent niobium. By way of example, the amount of niobium in the cobalt-based alloy infiltrant may be less than 21%, about 8.5% to about 31.5%, about 15% to about 20%, about 15% to about 25%, about 5% to about 15%, about 3% to about 6%, less than about 10%, less than about 5%, less than about 3%, about 1% to about 3% or about 0.5% to about 1.5% niobium by weight of the cobalt-based alloy infiltrant. In another embodiment, the amount may be effective to reduce the liquidus temperature at standard pressure to not more than about 1400° C., not more than about 1350° C., or not more than about 1300° C. At the eutectic composition, the liquidus temperature of the cobalt-phosphorus alloy is decreased from 1495° C. to about 1235° C.

Depending upon the fabrication technique used to form the cemented carbide substrate 108, the cobalt-based alloy infiltrant of the cemented carbide substrate 108 may have less than about 21% by weight niobium, but niobium may be present in the cobalt-based alloy infiltrant that is not in solid solution with cobalt in the form of a substantially pure niobium phase, an alloy phase of niobium, niobium carbide, or combinations thereof. In other embodiments, substantially all of the niobium in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-niobium system, but not all of the niobium may be in solid solution with the cobalt of the cobalt-based alloy infiltrant and may be present as substantially pure niobium, an alloy of niobium, niobium carbide, or combinations thereof. Regardless of whether the niobium that is not in solid solution with cobalt is considered part of (e.g., as in a multiphase cobalt-based alloy having two or more phases) or distinct from the cobalt-based alloy infiltrant in the PCD table 102, the total amount of niobium in the PCD table 102 by weight of the cobalt-based alloy infiltrant may still be at or near the eutectic composition of the cobalt-niobium system.

Cobalt-molybdenum is another embodiment of a cobalt-based alloy for the cobalt-based alloy infiltrant that forms a eutectic composition. The cobalt-molybdenum phase diagram includes a eutectic composition at about 37 weight percent molybdenum. By way of example, the amount of molybdenum in the cobalt-based alloy infiltrant may be less than 37%, about 15% to about 56%, about 10% to about 30%, about 15% to about 25%, about 5% to about 15%, about 3% to about 6%, less than about 10%, less than about 5%, less than about 3%, or about 0.5% to about 1.5% molybdenum by weight of the cobalt-based alloy infiltrant. In another embodiment, the amount may be effective to reduce the liquidus temperature at standard pressure to not more than about 1400° C., or not more than about 1350° C. At the eutectic composition, the liquidus temperature of the cobalt-molybdenum alloy is decreased from 1495° C. to about 1340° C. Similar to cobalt-silicon, with cobalt-molybdenum there may be a tendency for the molybdenum to consume diamond, forming molybdenum carbide at the expense of diamond-to-diamond bonding. Similar to the other eutectic forming alloying constituents, it may not be necessary to include such a high fraction of molybdenum to achieve the desired decrease in melting temperature and viscosity.

Depending upon the fabrication technique used to form the cemented carbide substrate 108, the cobalt-based alloy infiltrant of the cemented carbide substrate 108 may have less than about 37% by weight molybdenum, but molybdenum may be present in the cobalt-based alloy infiltrant that is not in solid solution with cobalt in the form of a substantially pure molybdenum phase, an alloy phase of molybdenum, molybdenum carbide, or combinations thereof. In other embodiments, substantially all of the molybdenum in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-molybdenum system, but not all of the molybdenum may be in solid solution with the cobalt of the cobalt-based alloy infiltrant and may be present as substantially pure molybdenum, an alloy of molybdenum, molybdenum carbide, or combinations thereof. Regardless of whether the molybdenum that is not in solid solution with cobalt is considered part of (e.g., as in a multiphase cobalt-based alloy having two or more phases) or distinct from the cobalt-based alloy infiltrant in the PCD table 102, the total amount of molybdenum in the PCD table 102 by weight of the cobalt-based alloy infiltrant may still be at or near the eutectic composition of the cobalt-molybdenum system.

Cobalt-antimony is another embodiment of a cobalt alloy for the cobalt-based alloy infiltrant that forms a eutectic composition. The cobalt-antimony phase diagram includes a eutectic composition at about 41.4 weight percent antimony. By way of example, the amount of antimony in the cobalt-based alloy infiltrant may be less than 41%, about 16% to about 62%, about 10% to about 30%, about 15% to about 25%, about 25% to about 35%, about 3% to about 6%, less than about 10%, less than about 5%, less than about 3%, or about 0.5% to about 1.5% antimony by weight of the cobalt-based alloy infiltrant. At the eutectic composition, the liquidus temperature of the cobalt-antimony alloy is decreased from 1495° C. to about 1095° C. Depending upon the fabrication technique used to form the cemented carbide substrate 108, the cobalt-based alloy infiltrant of the cemented carbide substrate 108 may have less than about 41% by weight antimony, but antimony may be present in the cobalt-based alloy infiltrant that is not in solid solution with cobalt in the form of a substantially pure antimony phase, an alloy phase of antimony, or combinations thereof. In another embodiment, the amount may be effective to reduce the liquidus temperature at standard pressure to not more than about 1400° C., not more than about 1350° C., not more than about 1300° C., or not more than 1200° C. In other embodiments, substantially all of the antimony in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-antimony system, but not all of the antimony may be in solid solution with the cobalt of the cobalt-based alloy infiltrant and may be present as substantially pure antimony, an alloy of antimony, or combinations thereof. Regardless of whether the antimony that is not in solid solution with cobalt is considered part of (e.g., as in a multiphase cobalt-based alloy having two or more phases) or distinct from the cobalt-based alloy infiltrant in the PCD table 102, the total amount of antimony in the PCD table 102 by weight of the cobalt-based alloy infiltrant may still be at or near the eutectic composition of the cobalt-antimony system.

Cobalt-tin is another embodiment of a cobalt alloy for the cobalt-based alloy infiltrant that forms a eutectic composition. The cobalt-tin phase diagram includes a eutectic composition at about 34 weight percent tin. By way of example, the amount of antimony in the cobalt-based alloy infiltrant may be less than 41%, about 14% to about 51%, about 10% to about 30%, about 15% to about 25%, about 25% to about 35%, about 20% to about 35%, about 3% to about 6%, less than about 10%, less than about 5%, less than about 3%, or about 0.5% to about 1.5% tin by weight of the cobalt-based alloy infiltrant. At the eutectic composition, the liquidus temperature of the cobalt-tin alloy is decreased from 1495° C. to about 1112° C. Depending upon the fabrication technique used to form the cemented carbide substrate 108, the cobalt-based alloy infiltrant of the cemented carbide substrate 108 may have less than about 34% by weight tin, but tin may be present in the cobalt-based alloy infiltrant that is not in solid solution with cobalt in the form of a substantially pure tin phase, an alloy phase of tin, or combinations thereof. In another embodiment, the amount may be effective to reduce the liquidus temperature at standard pressure to not more than about 1400° C., not more than about 1350° C., not more than about 1300° C., or not more than about 1200° C. In other embodiments, substantially all of the tin in the cemented carbide substrate 108 may be in the cobalt-based alloy infiltrant in a supersaturated metastable state. Likewise, the cobalt-based alloy infiltrant present in the interstitial regions of the PCD table 102 may exhibit a composition at or near the eutectic composition for the cobalt-tin system, but not all of the tin may be in solid solution with the cobalt of the cobalt-based alloy infiltrant and may be present as substantially pure tin, an alloy of tin, or combinations thereof. Regardless of whether the tin that is not in solid solution with cobalt is considered part of (e.g., as in a multiphase cobalt-based alloy having two or more phases) or distinct from the cobalt-based alloy infiltrant in the PCD table 102, the total amount of tin in the PCD table 102 by weight of the cobalt-based alloy infiltrant may still be at or near the eutectic composition of the cobalt-tin system.

It is contemplated that combinations of various eutectic forming alloying constituents may be employed, for example a cobalt-tantalum carbide alloy. In addition, with any of the foregoing eutectic forming alloying constituents, it is not necessary that the actual eutectic composition (i.e., where melting temperature is at its lowest) be used, as any amount up to this point (hypo-eutectic) may be used. In some embodiments, amounts above the eutectic composition (hyper-eutectic) may be employed. That said, in some embodiments, amounts above the actual eutectic composition point are not used, in order to avoid the formation of undesirable intermetallic compounds, which can often be brittle. Further, in some embodiments, those eutectic forming alloying constituents in which the eutectic composition is relatively low (e.g., less than about 15% by weight) may be employed as a greater decrease in liquidus temperature and viscosity is achieved with the inclusion of very small weight fractions (e.g., no more than about 5%) of alloying material. Examples of such eutectic forming alloying constituents include carbon, silicon, boron, and phosphorus. Where the eutectic point requires a higher fraction of alloying material, the slope of the melting temperature decrease is significantly more gradual, requiring the addition of large amounts of eutectic forming alloying constituent(s) to achieve the desired decrease in viscosity. Such large amounts of eutectic forming alloying constituents may be more likely to also provide unwanted side effects with such drastic changes to the composition.

Another embodiment including a combination of more than one of the foregoing eutectic forming alloying constituents is an alloy and/or mixture including cobalt, boron, and silicon. Such a tertiary or greater cobalt-boron-silicon alloy may include any of the weight fractions of silicon and boron described herein, with the balance comprising cobalt. A specific example of such a tertiary cobalt-boron-silicon alloy may include about 4.5% silicon by weight, about 3.2% boron by weight, and the balance cobalt (about 92.3% Co by weight). Another specific example of such a tertiary cobalt-boron-silicon alloy may include less than about 6% silicon by weight, less than about 6% boron by weight, and the balance cobalt (about 88% Co or more by weight). Another specific example of such a tertiary cobalt-boron-silicon alloy may include less than about 5% silicon by weight, less than about 4% boron by weight, and the balance cobalt (about 91% Co by weight). Further examples may include less than about 4% silicon by weight, less than about 3% boron by weight, and the balance cobalt; or less than about 1% silicon by weight, less than about 1% boron by weight, and the balance cobalt. In some embodiments, the boron content of the cobalt-boron-silicon alloy may be from greater than 0% to about 6% by weight, such as about 1% to about 5%, about 2% to about 4%, about 3% to about 5%, about 1% to about 3%, greater than 0% to about 4%, about 0.5% to about 2.5%, about 1.5% to about 3.5%, about 2.5% to about 3.5%, greater than 0% to about 2%, greater than 0% to about 1%, about 0.5% to about 1.5%, about 0.5% to about 1.5%, about 1% to about 2%, about 3% to about 4%, about 2.5% to about 4%, about 0.5% to about 3%, greater than 0% to about 3%, about 0.5%, about 1.0%, about 1.5%, about 2.0%, about 2.5%, about 3%, less than about 3%, less than about 4%, less than about 5%, or about 4% of the cobalt-boron-silicon alloy by weight; the silicon content of the cobalt-boron-silicon alloy may be from greater than 0% to about 6% by weight, such as about 1% to about 5%, about 2% to about 4%, about 3% to about 5%, about 1% to about 3%, greater than 0% to about 5%, about 0.5% to about 2.5%, about 1.5% to about 3.5%, about 2.5% to about 4.5%, greater than 0% to about 2%, about 0.5% to about 1.5%, about 0.5% to about 1.5%, about 1% to about 2%, about 2% to about 3%, about 3% to about 4%, about 2% to about 4%, about 2.5% to about 5%, about 4% to about 5%, greater than 0% to about 3%, about 0.5% to about 3%, greater than 0% to about 4%, about 1.0%, about 2.0%, about 3%, about 4%, or about 5% of the cobalt-boron-silicon alloy by weight; and the balance may be cobalt and any additional (e.g., quaternary or greater) alloying elements. In an embodiment, an infiltrant alloy may include any of the weight ranges above for boron and silicon content, with the balance of the cobalt-boron-silicon alloy being cobalt. Such tertiary alloys may be expected to provide a melting temperature between that exhibited by a Co—Si eutectic (e.g., about 1195° C.) and a Co—B eutectic (e.g., about 1102° C.). In addition, the presence of boron may improve the wetting angle between the carbide substrate and the foil, which may provide better bonding than might otherwise be achieved. In another embodiment, such a tertiary alloy may be effective to reduce the liquidus temperature at standard pressure to not more than 1450° C., not more than about 1400° C., not more than about 1350° C., not more than about 1300° C., or not more than 1200° C. In an embodiment, an infiltrant quaternary or greater alloy may include any of the weight ranges above for boron and silicon content, with the balance of the cobalt-nickel-boron-silicon alloy being cobalt and nickel. For example, a ratio of cobalt to nickel in such a cobalt-nickel-boron-silicon alloy may be 1.1 or greater, about 4 to about 9, about 2.5 to about 4, or about 3 to about 6.

In some embodiments, any of the binary or tertiary alloys herein may be used in combination with any of the other binary alloys herein. For example, a tertiary cobalt-boron-silicon alloy may be used in conjunction with a binary nickel-antimony alloy, a cobalt-boron alloy, cobalt-silicon alloy, or any other alloy(s) disclosed herein. In some embodiments, a cobalt-boron and cobalt-silicon binary alloys may be used in tandem to provide a net cobalt-boron-silicon tertiary alloy in the PCD table.

Alloys having more than three metallic components are also contemplated. For example, any of the binary or tertiary alloys disclosed herein may include one or more additional alloying components, such as one or more additional metals. The one or more additional metals may include any alloy infiltrant metal disclosed herein in any amount disclosed herein.

Nickel-Based Alloy Infiltrants

Nickel-silicon is an embodiment of a nickel-based alloy for a nickel-based alloy infiltrant that forms a eutectic composition at particular weight fractions of nickel and silicon. For example, the nickel-silicon phase diagram includes a eutectic composition at about 11.5% silicon by weight. By way of example, the amount of silicon in the nickel-based alloy infiltrant may be less than about 11.5%, less than about 7%, about 3% to about 17.5%, about 1% to about 10%, about 2% to about 8%, about 3% to about 7%, less than about 2%, less than about 1%, about 0.5% to about 1.5%, about 0.25% to about 1%, or about 0.1% to about 0.6% silicon by weight of the nickel-based alloy infiltrant. In another embodiment, the amount may be effective to reduce the liquidus temperature at standard pressure to not more than about 1400° C., not more than about 1350° C., not more than about 1300° C., or not more than about 1200° C. At the eutectic composition, the liquidus temperature of the nickel-silicon alloy is decreased from 1455° C. to about 1152° C. When employing the nickel-silicon alloy as the nickel-based alloy infiltrant, there may be a tendency for the silicon to consume diamond, forming silicon carbide at the expense of diamond-to-diamond bonding. In order to limit this tendency, in an embodiment, it is not necessary to include such a high fraction of silicon to decrease the liquidus temperature and viscosity to the desired degree, as any amount up to the eutectic composition may be used. It is currently believed that limiting the amount of silicon may also limit formation of silicon carbide at the expense of diamond-to-diamond bonding during HPHT infiltration of the nickel-based alloy infiltrant.

Depending upon the fabrication technique used to form the cemented carbide substrate 108, the nickel-based alloy infiltrant of the cemented carbide substrate 108 may have less than about 11.5% by weight silicon in solid solution with nickel, but silicon may be present in the nickel-based alloy infiltrant in the form of a substantially pure silicon phase, a silicon alloy phase, a silicide, silicon carbide, or combinations thereof. In other embodiments, substantially all of the silicon in the cemented carbide substrate 108 may be in solid solution with nickel of the nickel-based alloy infiltrant in a supersaturated metastable state. Likewise, the nickel-based alloy infiltrant present in the interstitial regions of the PCD table 102 may exhibit a composition at or near the eutectic composition for the nickel-silicon system, but not all of the silicon may be in solid solution with the nickel of the nickel-based alloy infiltrant and may be present as substantially pure silicon, an alloy of silicon, silicon carbide, or combinations thereof. Regardless of whether the silicon that is not in solid solution with nickel is considered part of (e.g., as in a multiphase nickel-based alloy having two or more phases) or distinct from the nickel-based alloy infiltrant in the PCD table 102, the total amount of silicon in the PCD table 102 by weight of the nickel-based alloy infiltrant may still be at or near the eutectic composition of the nickel-silicon system.

Nickel-carbon is another embodiment of a nickel-based alloy for the nickel-based alloy infiltrant that forms a eutectic composition. The nickel-carbon phase diagram includes a eutectic composition at about 2.22% weight of carbon. By way of example, the amount of carbon in the nickel-based alloy infiltrant may be less than about 2.22%, about 1% to about 5%, about 1% to less than 2.22%, about 0.5% to about 2%, about 1% to about 2%, about 0.75% to about 1.5%, about 0.5% to about 1.5%, less than about 1%, less than about 0.5%, or less than about 0.25% carbon by weight of the nickel-based alloy infiltrant. In another embodiment, the amount may be effective to reduce the liquidus temperature at standard pressure to not more than about 1400° C., or not more than about 1350° C. At the eutectic composition, the liquidus temperature of the nickel-carbon alloy is decreased from 1455° C. to about 1318° C.

Depending upon the fabrication technique used to form the cemented carbide substrate 108, the nickel-based alloy infiltrant of the cemented carbide substrate 108 may have less than about 2.22% by weight carbon, but carbon may be present in the nickel-based alloy infiltrant in another form, such as in the form of carbon rich carbide phases, graphite, or combinations thereof. In other embodiments, the nickel-based alloy infiltrant may have carbon present therein at or near the eutectic composition thereof in a supersaturated metastable state. Likewise, the nickel-based alloy infiltrant present in the interstitial regions of the PCD table 102 may exhibit a composition at or near the eutectic composition for the nickel-carbon system, but not all of the carbon may be in solid solution with the nickel of the nickel-based alloy infiltrant and may be present as graphite. Regardless of whether the carbon that is not in solid solution with nickel is considered part of or distinct from the nickel-based alloy infiltrant in the PCD table 102, the total amount of non-diamond carbon in the PCD table 102 by weight of the nickel-based alloy infiltrant may still be at or near the eutectic composition of the nickel-carbon system.

Nickel-boron is another embodiment of a nickel-based alloy for the nickel-based alloy infiltrant that forms a eutectic composition. The nickel-boron phase diagram includes a eutectic composition at about 4 weight percent boron. By way of example, the amount of boron in the nickel-based alloy infiltrant may be less than 4%, about 2% to about 8.25%, about 1% to about 4%, about 1% to about 2.5%, less than about 6%, less than about 5%, less than about 4%, less than about 2%, less than about 1%, about 0.5% to about 1.5%, about 2% to about 5%, or about 3% to about 4% boron by weight of the nickel-based alloy infiltrant. In another embodiment, the amount of boron may be effective to reduce the liquidus temperature at standard pressure to not more than about 1400° C., not more than about 1350° C., not more than about 1300° C., or not more than about 1200° C. At the eutectic composition, the liquidus temperature of the nickel-boron alloy is decreased from 1455° C. to about 1140° C. Similar to nickel-silicon, with nickel-boron there may be a tendency for the boron to consume diamond, forming boron carbide at the expense of diamond-to-diamond bonding. Similar to the other eutectic forming alloying constituents, it may not be necessary to include such a high fraction of boron to achieve the desired decrease in melting temperature and viscosity.

Depending upon the fabrication technique used to form the cemented carbide substrate 108, the nickel-based alloy infiltrant of the cemented carbide substrate 108 may have less than about 4% by weight boron, but boron may be present in the nickel-based alloy infiltrant that is not in solid solution with nickel in the form of a substantially pure boron, boron carbide, one or more types of borides, or combinations thereof. In other embodiments, substantially all of the boron in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-boron system, but not all of the boron may be in solid solution with the nickel of the nickel-based alloy infiltrant and may be present as substantially pure boron, boron carbide, one or more types of borides, or combinations thereof. Regardless of whether the boron that is not in solid solution with nickel is considered part of (e.g., as in a multiphase nickel-based alloy having two or more phases) or distinct from the nickel-based alloy infiltrant in the PCD table 102, the total amount of boron in the PCD table 102 by weight of the nickel-based alloy infiltrant may still be at or near the eutectic composition of the nickel-boron system.

Nickel-phosphorus is another embodiment of a nickel-based alloy for the nickel-based alloy infiltrant that forms a eutectic composition. The nickel-phosphorus phase diagram includes a eutectic composition at about 11 weight percent phosphorus. By way of example, the amount of phosphorus in the nickel-based alloy infiltrant may be less than 11%, about 4% to about 15%, about 1% to about 8%, less than about 3%, less than about 2%, less than about 1%, about 0.5% to about 1.5%, about 7% to about 9%, about 5% to about 8%, or about 3% to about 6% phosphorus by weight of the nickel-based alloy infiltrant. In another embodiment, the amount may be effective to reduce the liquidus temperature at standard pressure to not more than about 1400° C., not more than about 1350° C., not more than about 1300° C., or not more than about 1200° C. At the eutectic composition, the liquidus temperature of the nickel-phosphorus alloy is decreased from 1455° C. to about 880° C.

Depending upon the fabrication technique used to form the cemented carbide substrate 108, the nickel-based alloy infiltrant of the cemented carbide substrate 108 may have less than about 11% by weight phosphorus, but phosphorus may be present in the nickel-based alloy infiltrant that is not in solid solution with nickel in the form of a substantially pure phosphorous, one or more types of phosphides, or combinations thereof. In other embodiments, substantially all of the phosphorus in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-phosphorus system, but not all of the phosphorus may be in solid solution with the nickel of the nickel-based alloy infiltrant and may be present as substantially pure phosphorous, one or more types of phosphides, or combinations thereof. Regardless of whether the phosphorus that is not in solid solution with nickel is considered part of (e.g., as in a multiphase nickel-based alloy having two or more phases) or distinct from the nickel-based alloy infiltrant in the PCD table 102, the total amount of phosphorus in the PCD table 102 by weight of the nickel-based alloy infiltrant may still be at or near the eutectic composition of the nickel-phosphorus system.

Nickel-tantalum is another embodiment of a nickel-based alloy for the nickel-based alloy infiltrant that forms a eutectic composition. The nickel-tantalum phase diagram includes a eutectic composition at about 38 weight percent tantalum. By way of example, the amount of tantalum in the nickel-based alloy infiltrant may be less than 38%, about 10% to about 49%, about 10% to about 35%, about 15% to about 25%, less than about 10%, less than about 5%, less than about 3%, about 0.5% to about 1.5%, about 5% to about 15%, or about 3% to about 6% tantalum by weight of the nickel-based alloy infiltrant. In another embodiment, the amount may be effective to reduce the liquidus temperature at standard pressure to not more than about 1400° C. At the eutectic composition, the liquidus temperature of the nickel-tantalum alloy is decreased from 1455° C. to about 1360° C. Similar to nickel-silicon, with nickel-tantalum there may be a tendency for the tantalum to consume diamond, forming tantalum carbide at the expense of diamond-to-diamond bonding. Similar to the other eutectic forming alloying constituents, it may not be necessary to include such a high fraction of tantalum to achieve the desired decrease in melting temperature and viscosity. In other embodiments, any of the foregoing ranges for tantalum may be used for tantalum carbide or combinations of tantalum and tantalum carbide.

Depending upon the fabrication technique used to form the cemented carbide substrate 108, the nickel-based alloy infiltrant of the cemented carbide substrate 108 may have less than about 38% by weight tantalum, but tantalum may be present in the nickel-based alloy infiltrant that is not in solid solution with nickel in the form of a substantially pure phase of tantalum, an alloy phase of tantalum, tantalum carbide, or combinations thereof. In other embodiments, substantially all of the tantalum in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-tantalum system, but not all of the tantalum may be in solid solution with the nickel of the nickel-based alloy infiltrant and may be present as substantially pure tantalum, an alloy of tantalum, tantalum carbide, or combinations thereof. Regardless of whether the tantalum that is not in solid solution with nickel is considered part of (e.g., as in a multiphase nickel-based alloy having two or more phases) or distinct from the nickel-based alloy infiltrant in the PCD table 102, the total amount of tantalum in the PCD table 102 by weight of the nickel-based alloy infiltrant may still be at or near the eutectic composition of the nickel-tantalum system.

An embodiment may include more than one of the foregoing eutectic forming alloying constituents. For example, an alloy and/or mixture of nickel and tantalum carbide may be particularly beneficial as it may provide high lubricity, better high temperature performance (because tantalum is a refractory metal), and may limit any tendency of tantalum alone to consume diamond in the formation of tantalum carbide, as the tantalum instead is already provided in the form of tantalum carbide.

Another embodiment including more than one of the foregoing eutectic forming alloying constituents is an alloy and/or mixture of nickel, boron, and silicon. Such a tertiary alloy may include any of the weight fractions of silicon and boron as described above, with the balance comprising nickel. A specific example of such a tertiary alloy may include about 4.5 wt % silicon, about 3.2 wt % boron, and the balance nickel (about 92.3 wt % Ni). A specific example of such a tertiary alloy may include less than about 6 wt % silicon, less than about 6 wt % boron, and the balance nickel (about 88 wt % or more). Another specific example of such a tertiary alloy may include less than about 5 wt % silicon, less than about 4 wt % boron, and the balance nickel (about 91 wt %). Similar examples may include less than about 4 wt % silicon, less than about 3 wt % boron, and the balance nickel, or less than about 1 wt % silicon, less than about 1 wt % boron, and the balance nickel. Such a tertiary alloy may be expected to provide a melting temperature between that exhibited by a Ni—Si eutectic (e.g., about 1152° C.) and a Ni—B eutectic (e.g., about 1140° C.). In addition, the presence of boron improves the wetting angle between the carbide substrate and the foil, providing better bonding than might otherwise be achieved. In another embodiment, such a tertiary alloy may be effective to reduce the liquidus temperature at standard pressure to not more than 1450° C., not more than about 1400° C., not more than about 1350° C., or not more than about 1300° C.

Nickel-niobium is another embodiment of a nickel-based alloy for the nickel-based alloy infiltrant that forms a eutectic composition. The nickel-niobium phase diagram includes a eutectic composition at about 23.5 weight percent niobium. By way of example, the amount of niobium in the nickel-based alloy infiltrant may be less than 23.5%, about 8% to about 32%, about 15% to about 20%, about 15% to about 25%, about 5% to about 15%, about 3% to about 6%, less than about 10%, less than about 5%, less than about 3%, about 1% to about 3% or about 0.5% to about 1.5% niobium by weight of the nickel-based alloy infiltrant. At the eutectic composition, the liquidus temperature of the nickel-niobium alloy is decreased from 1455° C. to about 1270° C.

Depending upon the fabrication technique used to form the cemented carbide substrate 108, the nickel-based alloy infiltrant of the cemented carbide substrate 108 may have less than about 23.5% by weight niobium, but niobium may be present in the nickel-based alloy infiltrant that is not in solid solution with nickel in the form of a substantially pure niobium phase, an alloy phase of niobium, niobium carbide, or combinations thereof. In other embodiments, substantially all of the niobium in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-niobium system, but not all of the niobium may be in solid solution with the nickel of the nickel-based alloy infiltrant and may be present as substantially pure niobium, an alloy of niobium, niobium carbide, or combinations thereof. Regardless of whether the niobium that is not in solid solution with nickel is considered part of (e.g., as in a multiphase nickel-based alloy having two or more phases) or distinct from the nickel-based alloy infiltrant in the PCD table 102, the total amount of niobium in the PCD table 102 by weight of the nickel-based alloy infiltrant may still be at or near the eutectic composition of the nickel-niobium system. In another embodiment, the amount may be effective to reduce the liquidus temperature at standard pressure to not more than about 1400° C., not more than about 1350° C., or not more than about 1300° C. At the eutectic composition, the liquidus temperature of the nickel-niobium alloy is decreased from 1455° C. to about 1270° C.

Nickel-molybdenum is another embodiment of a nickel-based alloy for the nickel-based alloy infiltrant that forms a eutectic composition. The nickel-molybdenum phase diagram includes a eutectic composition at about 49 weight percent molybdenum. By way of example, the amount of molybdenum in the nickel-based alloy infiltrant may be less than 49%, about 15% to about 60%, about 15% to about 35%, about 20% to about 30%, about 5% to about 15%, about 3% to about 6%, less than about 10%, less than about 5%, less than about 3%, or about 0.5% to about 1.5% molybdenum by weight of the nickel-based alloy infiltrant. In another embodiment, the amount may be effective to reduce the liquidus temperature at standard pressure to not more than about 1450° C., not more than about 1400° C., or not more than about 1350° C. At the eutectic composition, the liquidus temperature of the nickel-molybdenum alloy is decreased from 1455° C. to about 1315° C. Similar to nickel-silicon, with nickel-molybdenum there may be a tendency for the molybdenum to consume diamond, forming molybdenum carbide at the expense of diamond-to-diamond bonding. Similar to the other eutectic forming alloying constituents, it may not be necessary to include such a high fraction of molybdenum to achieve the desired decrease in melting temperature and viscosity.

Depending upon the fabrication technique used to form the cemented carbide substrate 108, the nickel-based alloy infiltrant of the cemented carbide substrate 108 may have less than about 49% by weight molybdenum, but molybdenum may be present in the nickel-based alloy infiltrant that is not in solid solution with nickel in the form of a substantially pure molybdenum phase, an alloy phase of molybdenum, molybdenum carbide, or combinations thereof. In other embodiments, substantially all of the molybdenum in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-molybdenum system, but not all of the molybdenum may be in solid solution with the nickel of the nickel-based alloy infiltrant and may be present as substantially pure molybdenum, an alloy of molybdenum, molybdenum carbide, or combinations thereof. Regardless of whether the molybdenum that is not in solid solution with nickel is considered part of (e.g., as in a multiphase nickel-based alloy having two or more phases) or distinct from the nickel-based alloy infiltrant in the PCD table 102, the total amount of molybdenum in the PCD table 102 by weight of the nickel-based alloy infiltrant may still be at or near the eutectic composition of the nickel-molybdenum system.

Nickel-cerium is another embodiment of a nickel-based alloy for the nickel-based alloy infiltrant that forms a eutectic composition. The nickel-cerium phase diagram includes a eutectic composition at about 19 weight percent cerium. By way of example, the amount of cerium in the nickel-based alloy infiltrant may be less than 19%, about 5% to about 25%, about 10% to about 15%, about 15% to about 25%, about 5% to about 15%, about 3% to about 6%, less than about 5%, less than about 3%, less than about 2%, or about 0.5% to about 1.5% cerium by weight of the nickel-based alloy infiltrant. In another embodiment, the amount may be effective to reduce the liquidus temperature at standard pressure to not more than about 1400° C., not more than about 1350° C., or not more than about 1300° C. At the eutectic composition, the liquidus temperature of the nickel-cerium alloy is decreased from 1455° C. to about 1210° C. Similar to nickel-silicon, with nickel-cerium there may be a tendency for the cerium to consume diamond, forming cerium carbide at the expense of diamond-to-diamond bonding. Similar to the other eutectic forming alloying constituents, it may not be necessary to include such a high fraction of cerium to achieve the desired decrease in melting temperature and viscosity.

Depending upon the fabrication technique used to form the cemented carbide substrate 108, the nickel-based alloy infiltrant of the cemented carbide substrate 108 may have less than about 19% by weight cerium, but cerium may be present in the nickel-based alloy infiltrant that is not in solid solution with nickel in the form of a substantially pure cerium phase, an alloy phase of cerium, cerium carbide, or combinations thereof. In other embodiments, substantially all of the cerium in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-cerium system, but not all of the cerium may be in solid solution with the nickel of the nickel-based alloy infiltrant and may be present as substantially pure cerium, an alloy of cerium, cerium carbide, or combinations thereof. Regardless of whether the cerium that is not in solid solution with nickel is considered part of (e.g., as in a multiphase nickel-based alloy having two or more phases) or distinct from the nickel-based alloy infiltrant in the PCD table 102, the total amount of cerium in the PCD table 102 by weight of the nickel-based alloy infiltrant may still be at or near the eutectic composition of the nickel-cerium system.

Nickel-titanium is another embodiment of a nickel-based alloy for the nickel-based alloy infiltrant that forms a eutectic composition. The nickel-titanium phase diagram includes a eutectic composition at about 16.2 weight percent titanium. By way of example, the amount of titanium in the nickel-based alloy infiltrant may be less than 16.2%, about 3% to about 20%, about 5% to about 16.2%, about 10% to about 16.2%, about 5% to about 15%, about 3% to about 6%, less than about 5%, less than about 3%, or about 0.5% to about 1.5% titanium by weight of the nickel-based alloy infiltrant. In another embodiment, the amount may be effective to reduce the liquidus temperature at standard pressure to not more than 1400° C., not more than about 1350° C., or not more than about 1300° C. At the eutectic composition, the liquidus temperature of the nickel-titanium alloy is decreased from 1455° C. to about 1287° C. Similar to nickel-silicon, with nickel-titanium there may be a tendency for the titanium to consume diamond, forming titanium carbide at the expense of diamond-to-diamond bonding. Similar to the other eutectic forming alloying constituents, it may not be necessary to include such a high fraction of titanium to achieve the desired decrease in melting temperature and viscosity.

Depending upon the fabrication technique used to form the cemented carbide substrate 108, the nickel-based alloy infiltrant of the cemented carbide substrate 108 may have less than about 16.2% by weight titanium, but titanium may be present in the nickel-based alloy infiltrant that is not in solid solution with nickel in the form of a substantially pure titanium phase, an alloy phase of titanium, titanium carbide, or combinations thereof. In other embodiments, substantially all of the titanium in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-titanium system, but not all of the titanium may be in solid solution with the nickel of the nickel-based alloy infiltrant and may be present as substantially pure titanium, an alloy of titanium, titanium carbide, or combinations thereof. Regardless of whether the titanium that is not in solid solution with nickel is considered part of (e.g., as in a multiphase nickel-based alloy having two or more phases) or distinct from the nickel-based alloy infiltrant in the PCD table 102, the total amount of titanium in the PCD table 102 by weight of the nickel-based alloy infiltrant may still be at or near the eutectic composition of the nickel-titanium system.

Nickel-antimony is another embodiment of a nickel alloy for the nickel-based alloy infiltrant that forms a eutectic composition. The nickel-antimony phase diagram includes a eutectic composition at about 36 weight percent antimony. By way of example, the amount of antimony in the nickel-based alloy infiltrant may be less than 36%, about 15% to about 50%, about 10% to about 30%, about 15% to about 25%, about 25% to about 36%, about 3% to about 6%, less than about 10%, less than about 5%, less than about 3%, or about 0.5% to about 1.5% antimony by weight of the nickel-based alloy infiltrant. In another embodiment, the amount may be effective to reduce the liquidus temperature at standard pressure to not more than 1400° C., not more than about 1350° C., not more than about 1300° C., or not more than about 1200° C. At the eutectic composition, the liquidus temperature of the nickel-antimony alloy is decreased from 1455° C. to about 1097° C. Depending upon the fabrication technique used to form the cemented carbide substrate 108, the nickel-based alloy infiltrant of the cemented carbide substrate 108 may have less than about 36% by weight antimony, but antimony may be present in the nickel-based alloy infiltrant that is not in solid solution with nickel in the form of a substantially pure antimony phase, an alloy phase of antimony, or combinations thereof. In other embodiments, substantially all of the antimony in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-antimony system, but not all of the antimony may be in solid solution with the nickel of the nickel-based alloy infiltrant and may be present as substantially pure antimony, an alloy of antimony, or combinations thereof. Regardless of whether the antimony that is not in solid solution with nickel is considered part of (e.g., as in a multiphase nickel-based alloy having two or more phases) or distinct from the nickel-based alloy infiltrant in the PCD table 102, the total amount of antimony in the PCD table 102 by weight of the nickel-based alloy infiltrant may still be at or near the eutectic composition of the nickel-antimony system.

Nickel-tin is another embodiment of a nickel alloy for the nickel-based alloy infiltrant that forms a eutectic composition. The nickel-tin phase diagram includes a eutectic composition at about 32.5 weight percent tin. By way of example, the amount of tin in the nickel-based alloy infiltrant may be less than 32.5%, about 15% to about 40%, about 10% to about 32.5%, about 15% to about 25%, about 25% to about 35%, about 20% to about 35%, about 3% to about 6%, less than 10%, less than 5%, less than 3%, or about 0.5% to about 1.5% tin by weight of the nickel-based alloy infiltrant. In another embodiment, the amount may be effective to reduce the liquidus temperature at standard pressure to not more than 1400° C., not more than about 1350° C., not more than about 1300° C., or not more than about 1200° C. At the eutectic composition, the liquidus temperature of the nickel-tin alloy is decreased from 1455° C. to about 1130° C. Depending upon the fabrication technique used to form the cemented carbide substrate 108, the nickel-based alloy infiltrant of the cemented carbide substrate 108 may have less than about 32.5% by weight tin, but tin may be present in the nickel-based alloy infiltrant that is not in solid solution with nickel in the form of a substantially pure tin phase, an alloy phase of tin, or combinations thereof. In other embodiments, substantially all of the tin in the cemented carbide substrate 108 may be in the nickel-based alloy infiltrant in a supersaturated metastable state. Likewise, the nickel-based alloy infiltrant present in the interstitial regions of the PCD table 102 may exhibit a composition at or near the eutectic composition for the nickel-tin system, but not all of the tin may be in solid solution with the nickel of the nickel-based alloy infiltrant and may be present as substantially pure tin, an alloy of tin, or combinations thereof. Regardless of whether the tin that is not in solid solution with nickel is considered part of (e.g., as in a multiphase nickel-based alloy having two or more phases) or distinct from the nickel-based alloy infiltrant in the PCD table 102, the total amount of tin in the PCD table 102 by weight of the nickel-based alloy infiltrant may still be at or near the eutectic composition of the nickel-tin system.

It is contemplated that combinations of various eutectic forming alloying constituents may be employed, such as, for example, a nickel-tantalum carbide alloy or a nickel-siliconboron alloy. In addition, with any of the foregoing eutectic forming alloying constituents, it is not necessary that the actual eutectic composition (i.e., where melting temperature is at its lowest) be used, as any amount up to this point (hypo-eutectic), may be used. In some embodiments, amounts above the eutectic composition (hyper-eutectic) may be employed. That said, in some embodiments, amounts above the actual eutectic composition point are not used, in order to avoid the formation of undesirable intermetallic compounds, which can often be brittle. Further, in some embodiments, those eutectic forming alloying constituents in which the eutectic composition is relatively low (e.g., less than about 15% by weight) may be employed as a greater decrease in liquidus temperature and viscosity is achieved with the inclusion of very small weight fractions (e.g., less than about 5%, less than about 3%, less than about 1%) of alloying material. Examples of such eutectic forming alloying constituents include carbon, silicon, boron, and phosphorus. Where the eutectic point requires a higher fraction of alloying material, the slope of the melting temperature decrease is significantly more gradual, requiring the addition of large amounts of eutectic forming alloying constituent(s) to achieve the desired decrease in viscosity. Such large amounts of eutectic forming alloying constituents may be more likely to also provide unwanted side effects with such drastic changes to the composition.

The inventors currently believe that the infiltration depth "h" is primarily governed by capillary action, which depends heavily on the viscosity, surface energy, and contact angle of the cobalt-based or nickel-based alloy infiltrant, as well as the time period over which the HPHT conditions are maintained. For example, according to one theory, the infiltration depth "h" is approximated by the mathematical expression below:

$$h = \frac{2}{\pi}\left[\frac{rt\gamma\cos\vartheta}{2\nu}\right]^{\frac{1}{2}}$$

where:
h=infiltration depth;
r=radius of the interstitial regions of the PCD table 102 infiltrated with the cobalt-based or nickel-based alloy infiltrant;
t=infiltration time;
θ=contact angle of the cobalt-based and/or nickel-based alloy infiltrant with the PCD table 102;
γ=surface energy of the cobalt-based and/or nickel-based alloy infiltrant; and
ν=viscosity of the cobalt-based and/or nickel-based alloy infiltrant, which depends on temperature and pressure.

When the PDC table includes an extremely fine porous structure, the radius "r" of the interstitial regions of the PCD table 102 is extremely small. Such extremely fine porosity may be particularly associated with PCD tables formed under exceptionally high pressure conditions (e.g., at a cell pressure of at least about 7.5 GPa) in order to achieve enhanced diamond-to-diamond bonding. U.S. Pat. No. 7,866,418, the disclosure of which is incorporated herein by reference in its entirety, discloses PCD tables and associated PDCs formed under such exceptional conditions. Such enhanced diamond-to-diamond bonding is believed to occur as a result of the sintering pressure (e.g., at least about 7.5 GPa cell pressure) employed during the HPHT process being further into the diamond stable region and away from the graphite-diamond equilibrium line. The PCD tables disclosed in U.S. Pat. No. 7,866,418, as well as methods of fabrication disclosed therein, may be particularly suited for use with the embodiments disclosed herein employing a low viscosity cobalt-based and/or nickel-based alloy infiltrant to minimize or prevent delamination and chipping.

According to one theory, infiltration occurs through capillary action rather than a pressure differential. The viscosity of the cobalt-based and/or nickel-based alloy infiltrant increases at increased pressures, causing less infiltration to occur than at lower pressures, all else being equal. Viscosity is also affected by temperature, i.e., as temperature increases, viscosity decreases, so that at higher temperatures, increased infiltration results. However, increasing the processing temperature may result in undesirable side effects, including back conversion of diamond to graphite and/or carbon monoxide. For this reason, embodiments of the invention seek to process the PDC without significant increases to temperature, but by selecting the composition of the cobalt-based and/or nickel-based alloy infiltrant so that it exhibits greater viscosity at the given particular temperature and pressure. Alloying cobalt and/or nickel with at least one eutectic forming alloying constituent so that the cobalt-based and/or nickel-based alloy infiltrant exhibits a composition at or near a eutectic composition reduces both the liquidus temperature and viscosity of the cobalt-based and/or nickel-based alloy.

The temperature, pressure, and time period during the HPHT process used for attachment of the PCD table 102 to the cemented carbide substrate 108 may be controlled so as to provide for a desired infiltration depth "h." Partial infiltration of the PCD table 102 may provide the same or better wear resistance and/or thermal stability characteristics of a leached PCD table integrally formed on a substrate (i.e., a one-step PDC) without actual leaching having to be performed, as the infiltrant does not fully infiltrate to the working surface 106 of the PCD table 102. In some embodiments, the PCD table 102 may be leached to remove a portion of the infiltrant from the first region 110 to improve the uniformity of cobalt alloy and/or nickel alloy infiltrant in the first region 110, thermal stability, wear resistance, or combinations of the foregoing.

It is noted that a nonplanar interface 114 may be present between the first region 110 and the second region 112. One effect of this characteristic is that this nonplanar interface 114 between the first region 110 and the second region 112 differs from an otherwise similarly appearing PDC, but in which a region similar to second region 112 (in that it is substantially void of infiltrant) is formed by leaching, particularly if the PCD table 102 includes a chamfer formed therein. In such instances, the leaching profile advances from the outer surfaces exposed to the leaching acid.

For example, leaching typically progresses from the exterior surfaces downward and/or inward so that any chamfer or end exposed to the acid affects the leaching profile. Partial infiltration operates by a different mechanism in which infiltration occurs from the interface 109 into the PCD table 102 so that the presence of the chamfer 107 in the PCD table 102 does not affect the infiltration profile of the infiltrant. Additionally, if the infiltrant had infiltrated the entire PCD table 102 so that the interstitial regions of the second region 112 were also occupied by the infiltrant and subsequently removed in a leaching process to the depth "d," a boundary between the first region 110 and the second region 112 would be indicative of being defined by a leaching process.

As will be discussed in more detail below, the PCD table 102 may be formed separately from the cemented carbide substrate 108, and the PCD table 102 may be subsequently attached to the cemented carbide substrate 108. For example, in an embodiment, the PCD table 102 may be integrally formed with a first cemented carbide substrate, after which the first cemented carbide substrate is removed, the separated PCD table is at least partially leached, and the at least partially leached PCD table is then attached to the cemented carbide substrate 108 in a second HPHT process. In another embodiment, the PCD table 102 may be formed without using a cemented carbide substrate (e.g., by subjecting diamond particles and a metal-solvent catalyst to a HPHT process), after which the formed PCD table is at least partially leached and attached to the cemented carbide substrate 108. During attachment of PCD table 102 to the cemented carbide substrate 108, a cobalt-based and/or nickel-based alloy infiltrant is employed.

When attaching the PCD table 102 to the cemented carbide substrate 108 in a second HPHT process, the HPHT process conditions (e.g., maximum temperature, maximum pressure, and total process time) may be specifically chosen to result in only partial infiltration of the PCD table 102. As a result of this second HPHT process, the cobalt-based and/or nickel-based alloy infiltrant provided from the cemented carbide substrate 108 infiltrates from the cemented carbide substrate 108 into at least some of the interstitial regions of PCD table 102 in the first region 110. Additional details of such methods by which a PCD table 102 may be attached to a cemented carbide substrate after formation of the PCD table are disclosed in U.S. patent application Ser. No. 12/961,787 filed 7 Dec. 2010, the disclosure of which is incorporated herein, in its entirety, by reference.

Figure 2:
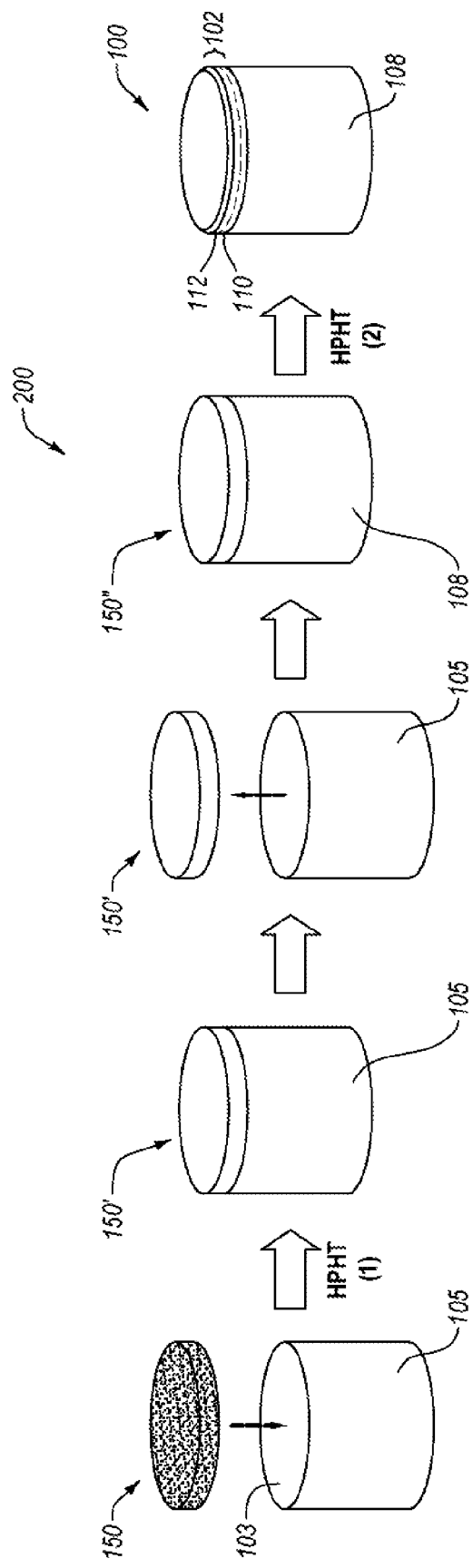
FIG. 2 is a schematic illustration of an embodiment of a method for fabricating the PDCs shown in FIGS. 1A-1C.

FIG. 2 is a schematic illustration of an embodiment of a method for fabricating the PDC 100 shown in FIG. 1. The plurality of diamond particles of the one or more layers of diamond particles 150 may be positioned adjacent to an interfacial surface 103 of a first cemented carbide substrate 105.

The diamond particle size distribution of the plurality of diamond particles may exhibit a single mode, or may be a bimodal or greater grain size distribution. In an embodiment, the diamond particles of the one or more layers of diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger average particle size (e.g., 50 μm, 40 μm, 30 μm, 20 μm, 15 μm, 12 μm, 10 μm, 8 μm) and another portion exhibiting at least one relatively smaller average particle size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger average particle size between about 10 μm and about 40 μm and another portion exhibiting a relatively smaller average particle size between about 1 μm and 4 μm. In some embodiments, the diamond particles may comprise three or more different average particle sizes (e.g., one relatively larger average particle size and two or more relatively smaller average particle sizes), without limitation.

The first cemented carbide substrate 105 and the one or more layers of diamond particles 150 having different average particle sizes may be placed in a pressure transmitting medium, such as a refractory metal can embedded in pyrophyllite or other pressure transmitting medium. The pressure transmitting medium, including the first cemented carbide substrate 105 and the one or more layers of diamond particles 150 therein, may be subjected to a first HPHT process using an ultra-high pressure cubic press to create temperature and pressure conditions at which diamond is stable. The temperature of the first HPHT process may be at least about 1000° C. (e.g., about 1200° C. to about 1600° C.) and the pressure of the first HPHT process may be at least 5.0 GPa cell pressure (e.g., at least about 7 GPa, about 7.5 GPa to about 12.0 GPa cell pressure, about 7.5 GPa to about 9.0 GPa cell pressure, or about 8.0 GPa to about 10.0 GPa cell pressure) for a time sufficient to sinter the diamond particles to form the PCD table 150'.

During the first HPHT process, the metal-solvent catalyst cementing constituent (e.g., cobalt) from the first cemented carbide substrate 105 may be liquefied and may infiltrate into the diamond particles of the one or more layers of diamond particles 150. The infiltrated metal-solvent catalyst cementing constituent functions as a catalyst that catalyzes initial formation of directly bonded-together diamond grains to form the PCD table 150'.

In an alternative to using the first cemented carbide substrate 105 during sintering of the diamond particles, the PCD table 150' may be formed by placing the diamond particles along with a metal-solvent catalyst (e.g., cobalt powder and/or a cobalt disc) in a pressure transmitting medium, such as a refractory metal can embedded in pyrophyllite or other pressure transmitting medium. The pressure transmitting medium, including the diamond particles and metal-solvent catalyst therein, may be subjected to a first HPHT process using an ultra-high pressure press to create temperature and pressure conditions at which diamond is stable. Such a process will result in the formation of a PCD table 150' separate from any cemented carbide substrate 105.

In embodiments in which the PCD table 150' is formed so as to be metallurgically bonded to a cemented carbide substrate, the PCD table 150' may then be separated from the first cemented carbide substrate 105, as shown in FIG. 2. For example, the PCD table 150' may be separated from the first cemented carbide substrate 105 by grinding and/or lapping away the first cemented carbide substrate 105, electro-discharge machining, laser cutting, or combinations of the foregoing material removal processes.

When the HPHT sintering pressure is greater than about 7.5 GPa cell pressure, optionally in combination with the average diamond particle size being less than 30 μm, the PCD table 150' (prior to being leached) defined collectively by the bonded diamond grains and the metal-solvent catalyst may exhibit a coercivity of about 115 Oe or more and a metal-solvent catalyst content of less than about 7.5 wt % as indicated by a specific magnetic saturation of about 15 G·cm$^3$/g or less. In another embodiment, the coercivity may be about 115 Oe to about 250 Oe and the specific magnetic saturation of the PCD table 150' (prior to being leached) may be greater than 0 G·cm$^3$/g to about 15 G·cm$^3$/g. In another embodiment, the coercivity may be about 115 Oe to about 175 Oe and the specific magnetic saturation of the PCD may be about 5 G·cm$^3$/g to about 15 G·cm$^3$/g. In yet another embodiment, the coercivity of the PCD table 150' (prior to being leached) may be about 155 Oe to about 175 Oe and the specific magnetic saturation of the first region 110 may be about 10 G·cm$^3$/g to about 15 G·cm$^3$/g. The specific permeability (i.e., the ratio of specific magnetic saturation to coercivity) of the PCD may be about 0.10 or less, such as about 0.060 G·cm$^3$/g·Oe to about 0.090 G·cm$^3$/g·Oe. In some embodiments, the average grain size of the bonded diamond grains may be less than about 30 μm and the metal-solvent catalyst content in the PCD table 150' (prior to being leached) may be less than about 7.5 wt % (e.g., about 1 to about 6 wt %, about 3 wt % to about 6 wt %, or about 1 wt % to about 3 wt %).

The specific magnetic saturation and the coercivity of the PCD table 150' may be tested by a number of different techniques to determine the specific magnetic saturation and coercivity. As merely one example, ASTM B886-03 (2008) provides a suitable standard for measuring the specific magnetic saturation and ASTM B887-03 (2008) e1 provides a suitable standard for measuring the coercivity of the sample region. Although both ASTM B886-03 (2008) and ASTM B887-03 (2008) e1 are directed to standards for measuring magnetic properties of cemented carbide materials, either standard may be used to determine the magnetic properties of PCD. A KOERZIMAT CS 1.096 instrument (commercially available from Foerster Instruments of Pittsburgh, Pa.) is one suitable instrument that may be used to measure the specific magnetic saturation and the coercivity of the sample region based on the foregoing ASTM standards. Additional details about the magnetic properties of PCD tables formed at a cell pressure greater than about 7.5 GPa and magnetic testing techniques can be found in U.S. Pat. No. 7,866,418, which was previously incorporated by reference.

Whether the first cemented carbide substrate 105 is employed during formation of the PCD table 150' or not, the metal-solvent catalyst may be at least partially removed from the PCD table 150' by immersing the PCD table 150' in aqua regia, nitric acid, hydrofluoric acid, mixtures thereof, or other suitable acid, to form a porous at least partially leached PCD table 150" that allows fluid to flow therethrough (e.g., from one side to another side). For example, the PCD table 150' may be immersed in the acid for about 2 to about 7 days (e.g., about 3, 4, 5, or 7 days) or for a few weeks (e.g., about 4-6 weeks) depending on the process employed. In some embodiments, a residual amount of the metal-solvent catalyst used to catalyze formation of the diamond-to-diamond bonds of the PCD table 150' may still remain even after leaching. For example, the residual metal-solvent catalyst in the interstitial regions may be about 0.5% to about 2% by weight, such as about 0.9% to about 1% by weight.

In embodiments employing the cemented carbide substrate 105, it is noted that because the metal-solvent catalyst is infiltrated into the diamond particles from the cemented carbide substrate 105 including tungsten carbide or other carbide grains cemented with a metal-solvent catalyst (e.g., cobalt, nickel, iron, or alloys thereof), the infiltrated metal-solvent catalyst may carry tungsten therewith, tungsten carbide therewith, another metal therewith, another metal carbide therewith, or combinations of the foregoing. In such embodiments, the PCD table 150' and the at least partially leached PCD table 150" may include such material(s) disposed interstitially between the bonded diamond grains. The tungsten therewith, tungsten carbide therewith, another metal therewith, another metal carbide therewith, or combinations of the foregoing may be at least partially removed by the selected leaching process or may be relatively unaffected by the selected leaching process.

As shown in FIG. 2, the at least partially leached PCD table 150" may be placed with the cemented carbide substrate 108 to which the at least partially leached PCD table 150" is to be attached to form an assembly 200. The assembly 200 may be placed in a pressure transmitting medium, such as a refractory metal can embedded in pyrophyllite or other pressure transmitting medium. The pressure transmitting medium, including the assembly 200, may be subjected to a second HPHT process using an ultra-high pressure cubic press to create temperature and pressure conditions at which diamond is stable. The temperature of the second HPHT process may be at least about 1000° C. (e.g., about 1200° C. to about 1600° C.) and the pressure of the second HPHT process may be at least 5.0 GPa cell pressure (e.g., about 5.0 GPa to about 12.0 GPa cell pressure). In some embodiments, the pressure of the second HPHT process may be less than that used in the first HPHT process to limit damage (e.g., cracking) to the at least partially leached PCD table 150". During the second HPHT process, the infiltrant comprises a cobalt-based alloy infiltrant exhibiting eutectic characteristics so that the viscosity of the cobalt-based and/or nickel-based alloy infiltrant is less than would be exhibited were cobalt and/or nickel alone used. The cobalt-based and/or nickel-based alloy infiltrant provided from the cemented carbide substrate 108 is liquefied and infiltrates into the at least partially leached PCD table 150" and/or the cemented carbide substrate 108. During and/or upon cooling from the second HPHT process, the partially infiltrated PCD table 102 is bonded to the cemented carbide substrate 108.

As an alternative to using the cemented carbide substrate 108 as an infiltrant source, an infiltrant layer (e.g., a cobalt-based and/or nickel-based alloy infiltrant disc, foil, and/or a generally conical member) may be disposed between the cemented carbide substrate 108 and the PCD table 150". In such an embodiment, the infiltrant layer may liquefy and infiltrate into the PCD table 150" during the second HPHT process. Such disc, foil, and/or generally conical members are described in more detail in conjunction with FIGS. 3A-3C. The infiltrant layer may include any of those infiltrants disclosed herein, such as a cobalt-based infiltrant, a nickel-based alloy infiltrant, a cobalt-boron-silicon alloy infiltrant, or combinations of any of the alloy infiltrants disclosed herein. Such infiltrants may be composed to melt prior to the cementing constituent from the cemented carbide substrate 108, such that the infiltrant material from the infiltrant layer penetrates into or infiltrates into at least some of the interstitial regions of the PCD table 150" and/or substrate 108 substantially prior to the cementing constituent melting. For example, an at least partially eutectic (e.g., hypoeutectic) nickel or cobalt-boron-silicon alloy infiltrant may melt and infiltrate into the first region 110 prior to the cementing constituent of the substrate 108 melting, which may prevent or limit the cementing constituent from infiltrating therein. Such a configuration may limit or prevent cementing constituent depletion in the cemented carbide substrate 108 and provide a relatively durable bond between the PCD table 150" and the substrate 108. In some embodiments, the cobalt-based and/or nickel-based alloy infiltrant that occupies the interstitial regions of the first region 110 of the PCD table 102 may be at least partially removed in a subsequent leaching process using an acid, such as aqua regia, nitric acid, hydrofluoric acid, mixtures thereof, or other suitable acid. Even though the second region 112 may already be substantially free of the infiltrant, the inventors have found that leaching may improve the uniformity of the interface 114 (see FIG. 1C) between the first and second regions 110 and 112 respectively, which may improve thermal stability and/or wear resistance in the finished PDC 100.

Figure 3A:
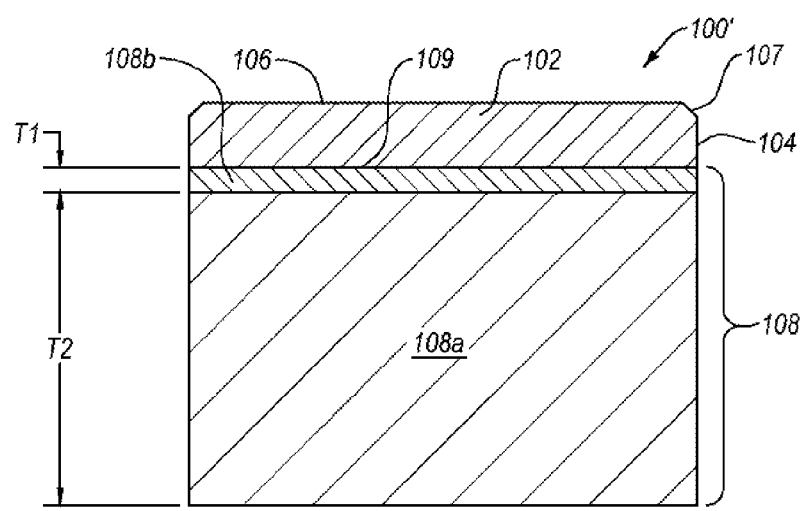
FIG. 3A is a cross-sectional view of an embodiment of a PDC including a disc that provides a cobalt-based and/or nickel-based alloy infiltrant, which is disposed between a substrate and a PCD table.

FIG. 3A is a cross-sectional view through a PDC 100', which may be formed with the use of a disc shaped member 108b for providing the cobalt-based and/or nickel-based alloy infiltrant having a composition at or near a eutectic composition thereof. During HPHT processing, the cobalt-based and/or nickel-based alloy infiltrant having a composition at or near a eutectic composition thereof sweeps up into the PCD table 102 during attachment of the PCD table 102 to the cemented carbide substrate 108. In such embodiments, the cemented carbide substrate 108 of PDC 100' may be considered to also include both disc portion 108b and adjacent substrate portion 108a. In an embodiment, disc portion 108b may exhibit any of the compositions discussed herein for the cemented carbide substrate 108 shown in FIGS. 1A-2.

In another embodiment, disc portion 108b may simply be a disc of the selected cobalt-based and/or nickel-based alloy infiltrant or mixture of cobalt and/or nickel and at least one eutectic forming alloying constituent in an amount at or near the eutectic composition of the cobalt—at least one eutectic forming alloying constituent system and/or the nickel—at least one eutectic forming alloying constituent system. In such an embodiment, during the second HPHT process, the cobalt-based and/or nickel-based alloy infiltrant from the disc 108b may liquefy and sweep into the PCD table 102, metallurgically bonding the substrate portion 108a and the PCD table 102 together. In other words, after processing, the cross-section may appear similar to the embodiments of FIG. 1B or 1C, without any distinct intermediate portion 108b.

The disc portion 108b may exhibit a thickness T1 of about 0.0050 inch to about 0.100 inch, such as about 0.0050 inch to about 0.030 inch, or about 0.020 inch to about 0.025 inch. The adjacent substrate portion 108a may exhibit a thickness T2 that will be dependent on the configuration of the desired PDC, for example between about 0.30 inch and about 0.60 inch.

Figure 3B:
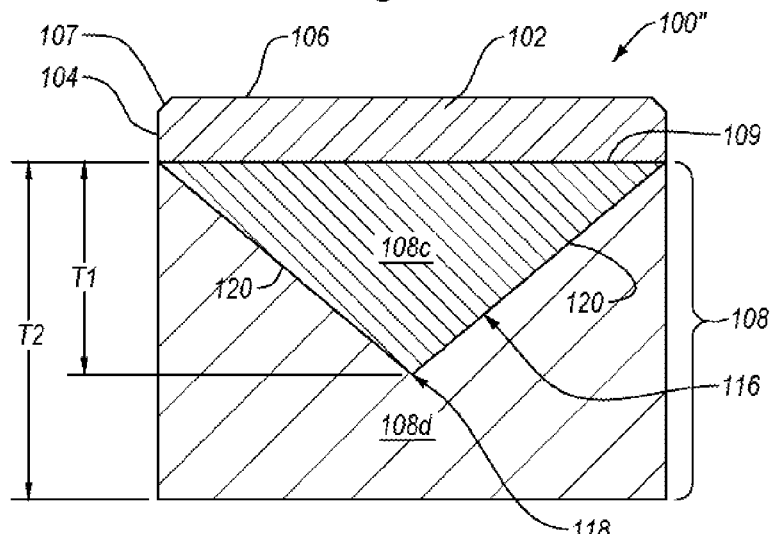
FIG. 3B is a cross-sectional view of an embodiment of a PDC including a generally conical insert that provides a cobalt-based and/or nickel-based alloy infiltrant, which is disposed between a substrate and a PCD table.
Figure 3C:
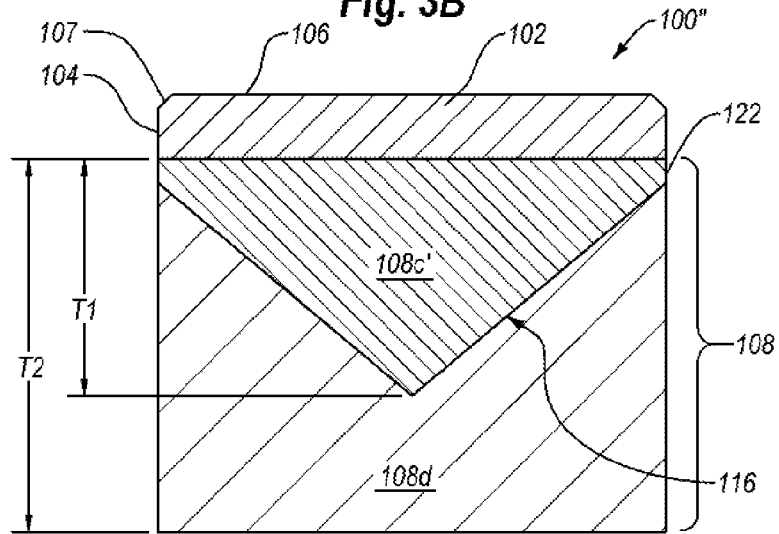
FIG. 3C is a cross-sectional view of an embodiment of a PDC including another configuration of a generally conical insert that provides a cobalt-based and/or nickel-based alloy infiltrant, which is disposed between a substrate and a PCD table.

FIG. 3B is a cross-sectional view through another PDC 100" similar to PDC 100' of FIG. 3A, but in which the member providing the cobalt-based alloy infiltrant is configured differently. In the interest of brevity, only the differences between the PDC 100" and the PDC 100' are described in detail below. The PDC 100" includes a PCD table 102. The PCD table 102 is bonded to the carbide substrate 108. The carbide substrate 108 includes a first substrate portion 108c having an interfacial surface 109 that is bonded to the PCD table 102 and a second substrate portion 108d bonded to the first substrate portion 108c. In FIGS. 3A-3C, the interfacial surface 109 is illustrated as substantially planar. However, in other embodiments, the interfacial surface 109 may exhibit a nonplanar topography. The first substrate portion 108c may exhibit any of the compositions discussed herein for the cemented carbide substrate 108 shown in FIGS. 1A-2. The second substrate portion 108d comprises a cemented carbide material (e.g., cobalt and/or nickel-cemented tungsten and/or tantalum carbide) that may be chosen to be more wear resistant or erosion resistant than that of the first substrate portion 108c, which it protects. For example, the second substrate portion 108d may exhibit a composition of about 13 weight % cobalt or nickel, with the balance being tungsten carbide and/or tantalum carbide.

In the illustrated embodiment, the first substrate portion 108c may exhibit a generally conical geometry having a triangular cross-sectional as shown. The first substrate portion 108c is received in a recess 116 formed in the second substrate portion 108a. The first substrate portion 108c extends from the interfacial surface 109 to an apex 118 to define a thickness T1, which may be about 0.050 inch to about 0.150 inch, such as about 0.075 inch to about 0.100 inch. A thickness T2 of the second substrate portion 108a may be about 0.30 inch to about 0.60 inch. The second substrate portion 108a substantially surrounds and is bonded to a lateral periphery 120 of the first substrate portion 108c to define an interface that may be observable in, for example, a SEM. During the second HPHT process, some of the cobalt-based and/or nickel-based alloy infiltrant of the first substrate portion 108c is swept into the PCD table 102, metallurgically bonding the PCD table 102 to the first substrate portion 108c and the second substrate portion 108d to the first substrate portion 108c.

The first substrate portion 108c may exhibit other configurations than that shown in FIG. 3B. For example, FIG. 3C is a cross-sectional view of another PDC 100" similar to that of FIG. 3B, but in which the "top" portion of first substrate portion 108c' includes a portion that forms the exterior peripheral surface of substrate 108. The geometry of substrate portions 108c' may be considered to include a conical lower portion similar to conical substrate portion 108c of FIG. 3B in combination with a disc shaped substrate portion 108b of FIG. 3A. The disk portion at the top of substrate portion 108c' (e.g., analogous to disc substrate portion 108b) extends above the recess 116 of the second substrate portion 108d and is bonded to the PCD table 102. FIGS. 3A-3C illustrate example geometries for first and second substrate portions. Other complementary geometries may also be employed.

Figure 4:
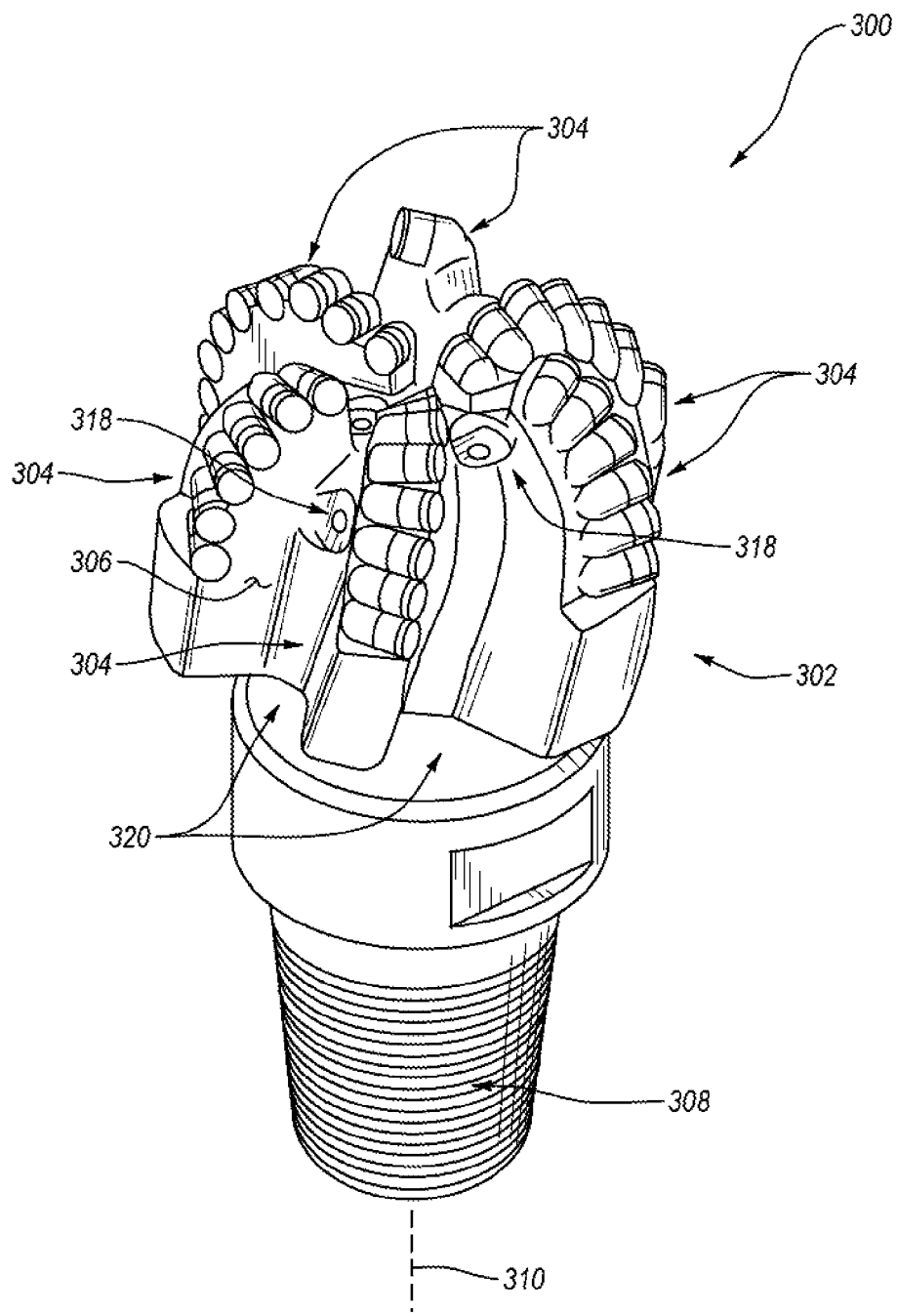
FIG. 4 is an isometric view of an embodiment of a rotary drill bit that may employ one or more of the disclosed PDC embodiments as cutting elements.
Figure 5:
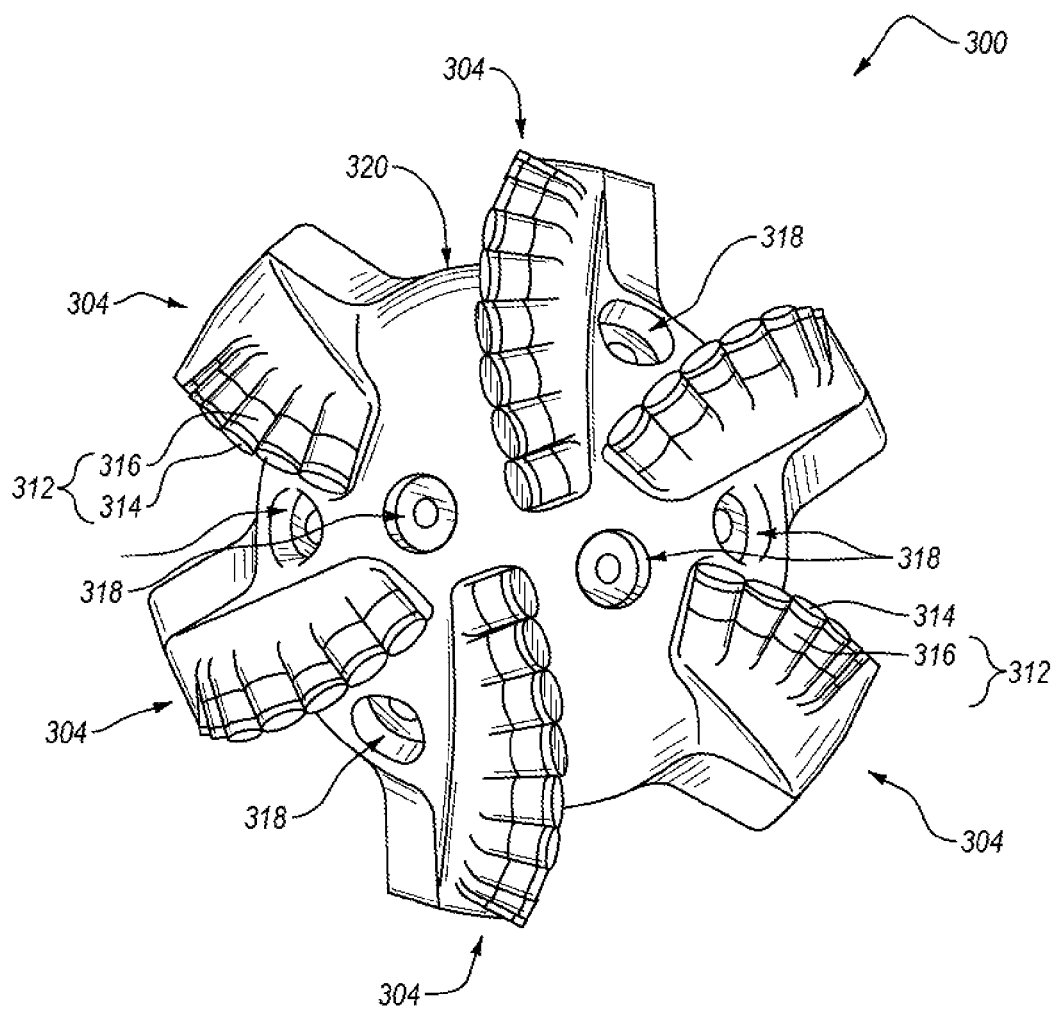
FIG. 5 is a top elevation view of the rotary drill bit shown in FIG. 8.

4 is an isometric view and FIG. 5 is a top elevation view of an embodiment of a rotary drill bit 300 that includes at least one PDC configured and/or fabricated according to any of the disclosed PDC embodiments. The rotary drill bit 300 comprises a bit body 302 that includes radially-extending and longitudinally-extending blades 304 having leading faces 306, and a threaded pin connection 308 for connecting the bit body 302 to a drilling string. The bit body 302 defines a leading end structure for drilling into a subterranean formation by rotation about a longitudinal axis 310 and application of weight-on-bit. At least one PDC cutting element 312, configured according to any of the previously described PDC embodiments, may be affixed to the bit body 302. With reference to FIG. 5, each of a plurality of PCD cutting elements 312 is secured to the blades 304 of the bit body 302 (FIG. 4). For example, each PCD cutting element 312 may include a PCD table 314 bonded to a substrate 316. More generally, the PCD cutting elements 312 may comprise any PDC disclosed herein, without limitation. In addition, if desired, in some embodiments, a number of the PCD cutting elements 312 may be conventional in construction. Also, circumferentially adjacent blades 304 define so-called junk slots 320 therebetween. Additionally, the rotary drill bit 300 includes a plurality of nozzle cavities 318 for communicating drilling fluid from the interior of the rotary drill bit 300 to the PDCs 312.

FIGS. 4 and 5 merely depict one embodiment of a rotary drill bit that employs at least one PDC fabricated and structured in accordance with the disclosed embodiments, without limitation. The rotary drill bit 300 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIG. 1A) may also be utilized in applications other than cutting technology. For example, the disclosed PDC embodiments may be used in wire dies, bearings, artificial joints, inserts, cutting elements, and heat sinks Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIG. 1A) configured according to any of the embodiments disclosed herein and may be operably assembled to a downhole drilling assembly. U.S. Pat. Nos. 4,410,054; 4,560,014; 5,364,192; 5,368,398; 5,480,233; 7,552,782; and 7,559,695, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of fabricating a polycrystalline diamond compact, comprising:
    forming a polycrystalline diamond table in the presence of a metal-solvent catalyst in a first high-pressure/high-temperature process, the polycrystalline diamond table including a plurality of bonded diamond grains defining a plurality of interstitial regions, at least a portion of the plurality of interstitial regions including the metal-solvent catalyst disposed therein;
    at least partially leaching the polycrystalline diamond table to remove at least a portion of the metal-solvent catalyst therefrom to form an at least partially leached polycrystalline diamond table;
    subjecting the at least partially leached polycrystalline diamond table and a substrate to a second high-pressure/high-temperature process under diamond-stable temperature-pressure conditions effective to at least partially infiltrate the at least partially leached polycrystalline diamond table with an alloy infiltrant comprising a cobalt-boron-silicon alloy infiltrant; and
    wherein the at least partially infiltrated polycrystalline diamond table includes a first region adjacent to the substrate that includes the cobalt-boron-silicon alloy infiltrant disposed in at least a portion of the interstitial regions thereof, and a second region extending inwardly from an exterior surface that is substantially free of the cobalt-boron-silicon alloy infiltrant.

2. The method of claim 1 wherein the cobalt-boron-silicon alloy infiltrant has a composition that is at or near a eutectic composition.

3. The method of claim 2 wherein one or more of silicon or boron from the cobalt-boron-silicon alloy infiltrant is present in a hypo-eutectic amount or a hyper-eutectic amount.

4. The method of claim 1 wherein the cobalt-boron-silicon alloy infiltrant includes greater than 0% to about 6% silicon by weight, greater than 0% to about 6% boron by weight, and the balance being cobalt.

5. The method of claim 1 wherein the cobalt-boron-silicon alloy infiltrant includes greater than 0% to about 5% silicon by weight, greater than 0% to about 4% boron by weight, and the balance being cobalt.

6. The method of claim 1 wherein the cobalt-boron-silicon alloy infiltrant includes greater than 0% to about 4% silicon by weight, greater than 0% to about 3% boron by weight, and the balance being cobalt.

7. The method of claim 1 wherein the cobalt-boron-silicon alloy infiltrant includes nickel.

8. The method of claim 1, further comprising leaching a portion of the cobalt-boron-silicon alloy infiltrant from the at least partially infiltrated polycrystalline diamond table to form the second region.

9. The method of claim 1 wherein infiltration of the cobalt-boron-silicon alloy infiltrant is only partially complete, so as to form the second region.

10. The method of claim 1 wherein the second region includes a second infiltrant therein, the second infiltrant including one or more of copper, tin, germanium, gadolinium, magnesium, lithium, silicon, silver, zinc, gallium, antimony, bismuth, alloys of any of the foregoing, or combinations of any of the foregoing.

11. The method of claim 1 wherein the cobalt-boron-silicon alloy infiltrant is provided from the substrate.

12. The method of claim 1 further comprising providing the cobalt-boron-silicon alloy infiltrant from an alloy source disposed between the at least partially leached polycrystalline diamond table and the substrate.

13. The method of claim 12 wherein the cobalt-boron-silicon alloy source includes one or more of a foil, a disc, a powder, or a paste.

14. A method of fabricating a rotary drill bit that includes a polycrystalline diamond compact, the method comprising:
    receiving a polycrystalline diamond compact formed by a method including:
        forming a polycrystalline diamond table in the presence of a metal-solvent catalyst in a first high-pressure/high-temperature process, the polycrystalline diamond table including a plurality of bonded diamond grains defining a plurality of interstitial regions, at least a portion of the plurality of interstitial regions including the metal-solvent catalyst disposed therein;
        at least partially leaching the polycrystalline diamond table to remove at least a portion of the metal-solvent catalyst therefrom to form an at least partially leached polycrystalline diamond table, the polycrystalline diamond table having a first thickness;
        subjecting the at least partially leached polycrystalline diamond table and a substrate having a second thickness to a second high-pressure/high-temperature process under diamond-stable temperature-pressure conditions effective to at least partially infiltrate the at least partially leached polycrystalline diamond table with an alloy infiltrant comprising a cobalt-boron-silicon alloy infiltrant, the second thickness of the substrate being greater than the first thickness of the at least partially leached polycrystalline diamond table; and affixing the polycrystalline diamond compact to a bit body, the polycrystalline diamond compact including the at least partially infiltrated polycrystalline diamond table and the substrate.

15. The method of claim 14 wherein the cobalt-boron-silicon alloy infiltrant has a composition that is at or near a eutectic composition.

16. The method of claim 15 wherein one or more of silicon or boron from the cobalt-boron-silicon alloy infiltrant is present in a hypo-eutectic amount or a hyper-eutectic amount.

17. A method of fabricating a polycrystalline diamond compact, comprising:

forming a polycrystalline diamond table in the presence of a metal-solvent catalyst in a first high-pressure/high-temperature process, the polycrystalline diamond table including a plurality of bonded diamond grains defining a plurality of interstitial regions, at least a portion of the plurality of interstitial regions including the metal-solvent catalyst disposed therein;

at least partially leaching the polycrystalline diamond table to remove at least a portion of the metal-solvent catalyst therefrom to form an at least partially leached polycrystalline diamond table;

subjecting the at least partially leached polycrystalline diamond table and a substrate to a second high-pressure/high-temperature process under diamond-stable temperature-pressure conditions effective to at least partially infiltrate the at least partially leached polycrystalline diamond table with an alloy infiltrant comprising a cobalt-boron-silicon alloy infiltrant; and wherein:

infiltration of the cobalt-boron-silicon alloy infiltrant is only partially complete so that the polycrystalline diamond table includes a first region adjacent to the substrate that includes the cobalt-boron-silicon alloy infiltrant disposed in at least a portion of the interstitial regions thereof, and a second region extending inwardly from an exterior surface that is substantially free of the cobalt-boron-silicon alloy infiltrant; and the second region includes a second infiltrant, the second infiltrant including one or more of copper, tin, germanium, gadolinium, magnesium, lithium, silicon, silver, zinc, gallium, antimony, bismuth, alloys of any of the foregoing, or combinations of any of the foregoing.

18. The method of claim 17 wherein the cobalt-boron-silicon alloy infiltrant includes greater than 0% to about 6% silicon by weight, greater than 0% to about 6% boron by weight, and the balance being cobalt.

19. The method of claim 17 wherein the cobalt-boron-silicon alloy infiltrant includes nickel.

* * * * *